United States Patent
Nagayoshi et al.

(10) Patent No.: US 11,436,381 B2
(45) Date of Patent: Sep. 6, 2022

(54) INFORMATION PROCESSING DEVICE, INFORMATION PROCESSING SYSTEM AND INFORMATION PROCESSING METHOD

(71) Applicant: NIPPON TELEGRAPH AND TELEPHONE CORPORATION, Tokyo (JP)

(72) Inventors: Takeshi Nagayoshi, Musashino (JP); Kenichiro Muto, Musashino (JP); Ryota Sato, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/258,454

(22) PCT Filed: Jul. 29, 2019

(86) PCT No.: PCT/JP2019/029661
§ 371 (c)(1),
(2) Date: Jan. 7, 2021

(87) PCT Pub. No.: WO2020/027055
PCT Pub. Date: Feb. 6, 2020

(65) Prior Publication Data
US 2021/0271780 A1   Sep. 2, 2021

(30) Foreign Application Priority Data
Jul. 30, 2018   (JP) .............................. JP2018-142621

(51) Int. Cl.
*G06F 21/84*   (2013.01)
*G06F 21/57*   (2013.01)
(Continued)

(52) U.S. Cl.
CPC .............. *G06F 21/84* (2013.01); *G06F 21/57* (2013.01); *G06F 21/64* (2013.01); *G06F 21/71* (2013.01);
(Continued)

(58) Field of Classification Search
CPC ........... G06F 21/84; G06F 21/71; G06F 21/74
See application file for complete search history.

(56) References Cited

U.S. PATENT DOCUMENTS

| | | | |
|---|---|---|---|
| 2006/0195907 A1* | 8/2006 | Delfs ....................... | G06F 21/74 713/181 |
| 2010/0031320 A1* | 2/2010 | Bhesania .............. | G06F 21/554 726/4 |

(Continued)

OTHER PUBLICATIONS

"User Account Control: Switch to the Secure Desktop when Prompting for Elevation" Available Online At: https://docs.microsoft.com/en-us/windows/security/threat-protection/security-policy-settings/user-account-control-switch-to-the-secure-desktop-when-prompting-for-elevation, Apr. 19, 2017, 4 pages.
(Continued)

*Primary Examiner* — Ellen Tran
(74) *Attorney, Agent, or Firm* — Xsensus LLP

(57) ABSTRACT

An information processing apparatus includes a normal user interface (NUI) functional unit, a secure user interface (SUI) functional unit having a protection level higher than that of the NUI functional unit, and an input/output unit that receives an input of information and displays and outputs the information. The NUI functional unit causes the input/output unit to display a NUI screen which receives an input of a query and transmits, as a query, the query input via the NUI screen to the SUI functional unit. The SUI functional unit produces a summary corresponding to the query on the basis of certification data including a query and a summary
(Continued)

corresponding to the query and causes the input/output unit to display a SUI screen having the query and the summary.

15 Claims, 17 Drawing Sheets

(51) Int. Cl.
    *G06F 21/64*     (2013.01)
    *G06F 21/71*     (2013.01)
    *G06F 21/74*     (2013.01)

(52) U.S. Cl.
    CPC ........ *G06F 21/74* (2013.01); *G06F 2221/032* (2013.01)

(56) References Cited

U.S. PATENT DOCUMENTS

| | | | |
|---|---|---|---|
| 2014/0096222 A1* | 4/2014 | Colnot | G06F 21/74 726/5 |
| 2014/0215356 A1* | 7/2014 | Brander | H04W 12/02 715/753 |
| 2018/0121681 A1* | 5/2018 | Huang | G06F 21/84 |
| 2018/0196937 A1* | 7/2018 | Kwag | G06F 21/52 |

OTHER PUBLICATIONS

"GlobalPlatform Publishes Specification For The 'Trusted' User Interface on Mobile Devices", Global Platform, Media and Resource Center, Available Online At: https://www.globalplatform.org/mediapressview.asp?id=1029, Oct. 30, 2013, 2 pages.

\* cited by examiner

INFORMATION PROCESSING DEVICE, INFORMATION PROCESSING SYSTEM AND INFORMATION PROCESSING METHOD

CROSS-REFERENCE TO RELATED APPLICATIONS

The present application is based on PCT filing PCT/JP2019/029661, filed Jul. 29, 2019, which claims priority to JP 2018-142621, filed Jul. 30, 2018, the entire contents of each are incorporated herein by reference.

TECHNICAL FIELD

The present invention relates to an information processing apparatus, an information processing system, and an information processing method.

BACKGROUND ART

There is a demand for a user interface (UI) by which, when a program displays a result of processing a large amount of information, such as a result of confirming a security check in response to a request input by a user, the user is allowed to confirm that input/output information is not falsified in an information transmission path from the program to the user. As the UI in demand, technology satisfying the following requirements will be hereinafter generally referred to as a secure user interface (SUI).

A first requirement for the SUI is that components (software or hardware) of an information processing apparatus are distributed to a protected region and to an unprotected region.

A second requirement for the SUI includes a case where the user is notified of information (trusted output: TOUT) generated by software in the protected region and a case where the software in the protected region is notified of information (trusted input: TIN) input by the user.

A third requirement for the SUI is that the component in the unprotected region is a user interface which cannot falsify the TIN or TOUT.

A fourth requirement for the SUI is that the SUI is a user interface having a means (SUI confirmation method) by which, when using the user interface, the user is allowed to recognize whether or not the user interface is the SUI.

In general, the SUI is realized using an input/output unit (such as a screen or a keyboard) of an information processing apparatus. For example, in a normal state, software in the unprotected region displays information on a screen and, only when the SUI is required, software in the protected region interrupts the same screen and displays the TOUT. In such a case, a means (SUI confirmation method) which allows the user to confirm whether or not information on the screen is the TOUT is essentially required.

When the SUI confirmation method is not provided, the software in the unprotected region displays, on the screen, the TOUT which is indistinguishable from the SUI to be able to cheat the user. A description will be given below of a first conventional technique and a second conventional technique which are considered to successfully realize the SUI. In each of the first and second conventional techniques, a secure desk top for user account control is provided.

First, a description will be given of the first conventional technique (see NPL1). The first conventional technique provides a UI which darkens a screen during an operation of upgrading a user to a privileged user to temporarily prevent the user from operating windows other than a window for the operation of promoting the user to the privileged user and thus provides the user with the secure desktop. Assuming that the first conventional technique corresponds to the SUI, a description will be given of the first conventional technique by applying every detail of the first conventional technique to the first to fourth requirements for the SUI described above.

In the first conventional technique, the protected region shown in the first requirement corresponds to an operating system and an application program protected equally to the operating system (the foregoing will be hereinafter generally referred to as an "OS"). Meanwhile, in the first conventional technique, the unprotected region shown in the first requirement corresponds to an application program other than the OS.

In the first conventional technique, the TOUT shown in the second requirement corresponds to a password input screen (display of a promoting operation screen and a password input field) displayed by the OS to the user to allow the user to be promoted to the privileged user, while the TIN corresponds to a password input by the user to the OS to be promoted to the privileged user. These TOUT and TIN are based on the OS, and therefore satisfy the third requirement that cannot be falsified by an application program other than the OS.

In the first conventional technique, by darkening the screen and temporarily preventing the user from operating the windows other than the window for the promoting operation, the user is allowed to confirm whether or not the window is secure. The confirmation method corresponds to the SUI confirmation method shown in the fourth requirement.

When the SUI according to the first conventional technique is not provided, the following threat arises. Specifically, when software (such as malware) in the unprotected region fakes and displays a TOUT (password input screen), the user may possibly input a password to the malware, not to the OS. In this case, a password of the privileged user serving as a basis for security of the apparatus is stolen by the malware.

Additionally, when the SUI according to the first conventional technique is not provided, the software (such as malware) in the unprotected region may possibly falsify a TIN (password). In this case, the user is not allowed to be promoted to the privileged user, which interrupts a service operation.

Next, a description will be given of the second conventional technique (see NPL2). The second convention technique provides a UI which provides a user with a secure desktop by, e.g., displaying information knowable only by the user (e.g., a mother's maiden name) that is recorded in a security module or turning ON an LED lamp operable only by a program in the security module or the like. Assuming that the second conventional technique corresponds to the SUI, a description will be given of the second conventional technique by applying every detail of the second conventional technique to the first to fourth requirements for the SUI described above.

In the second conventional technique, the protected region shown in the first requirement corresponds to data recorded inside the security module and a trusted application (TA) that operates in the security module. Note that the security module is hardware serving as a component of an information processing apparatus and having an arithmetic function and a memory inside the security module which are independent of a main processor and a main memory of the information processing apparatus. Accordingly, it is extremely difficult to falsify or bug information inside the security module from the outside thereof. Meanwhile, in the second conventional technique, the unprotected region shown in the first requirement corresponds to data recorded outside the security module and software (including an OS outside the security module) that operates outside the security module.

In the second conventional technique, the TOUT shown in the second requirement corresponds to, e.g., a billing screen (display of a purchased product name and a billed amount and a payment PIN code input field) displayed by the TA to the user. In the second conventional technique, the TIN shown in the second requirement corresponds to, e.g., a payment PIN code to be input by the user to the TA.

In the second conventional technique, the user is allowed to confirm whether or not the window is secure by, e.g., not only displaying information knowable only by the user (e.g., a mother's maiden name) which is recorded in the security module, but also turning ON the LED lamp operable only by the program in the security module or the like. The confirmation method corresponds to the SUI confirmation method shown in the fourth requirement. The information knowable only by the user is recorded in the security module, and cannot be falsified. In addition, since the LED lamp or the like is operable only by the program in the security module, operation processing cannot be falsified. Therefore, the second conventional technique satisfies the third requirement.

According to the second conventional technique, by performing processing such as encryption inside the protected region with respect to the input PIN code, it is possible to transmit the PIN code to an outside of the safely protected region (such as a settlement institution).

When the SUI according to the second conventional technique is not provided, the following threat arises. Specifically, when software (such as malware) in the unprotected region fakes a TOUT (billing screen) and displays the faked screen, the user may possibly input the PIN code to the malware, not to the OS. In this case, use of the PIN code stolen by the malware causes a financial damage.

When the software (such as malware) in the unprotected region fakes a TOUT (purchased product name and a billed amount on the billing screen) and displays the faked screen, the user may possibly pay thereto. In this case, the user or a seller incurs a damage due to a difference between a value of the purchased product and an amount paid.

In addition, the software (such as malware) in the unprotected region may possibly falsify a TIN (payment PIN code). In this case, a PIN collation in payment results in an error, which interrupts a service.

CITATION LIST

Non Patent Literatures

[NPL 1] User Account Control: Switch to the secure desktop when prompting for elevation, Microsoft, [retrieved Apr. 6, 2018], the Internet<URL: https://docs.microsoft-.com/en-us/windows/security/threat-protection/security-policy-settings/user-account-control-switch-to-the-secure-desktop-when-prompting-for-elevation>

[NPL 2] 'Trusted' User Interface, GlobalPlatform, [Retrieved Apr. 6, 2018], the Internet<URL: https://www-.globalplatform.org/mediapressview.asp?id=1029>

SUMMARY OF THE INVENTION

Technical Problem

Each of the first technique and the second technique is used for a use application which handles a TOUT and a TIN each including a small amount of information. However, there is also a use application which prefers to use a SUI to handle a TOUT and a TIN each including an amount of information larger than that handled in each of the first conventional technique and the second conventional technique.

For example, it is required to apply the SUI to a use application (generally referred to as security verification) such as confirmation of a result of a virus scan or confirmation of a result of a file falsification check.

In a use application for security verification, when a user operation is faked, the following threat arises. Specifically, the threat is such that there is virus infection, but it is pretended that there is no virus infection. Alternatively, the threat is such that there is file falsification, but it is pretended that there is no file falsification.

In general, when a PC or server equipment performs a virus scan or a file falsification check, a large number of (several tens of thousands of) confirmation results are output from one scan. When security verification is performed on a system including a large number of devices, a larger number of confirmation results are output.

When an operation for such security verification is performed using the SUI, a user interface "which has multiple functions and processes a larger amount of information" than processed in each of the first conventional technique and the second conventional technique is required. Examples of the multiple functions include a screen transition/scroll function for displaying a large number of confirmation results on a screen and a function of receiving conditions (a period, a device ID, an event type, and an order in which logical relations therebetween, such as AND and OE, are displayed) for displaying the confirmation results on a screen.

However, when the SUI described above is realized using the first conventional technique or the second conventional technique described above, the following problems arise.

First, a description will be given of a problem to be solved in implementing the SUI as part of the OS. In this case, a problem arises in that, to ensure the SUI confirmation method, functions of an UI which can be implemented as the SUI are limited.

For example, the SUI confirmation method according to the first conventional technique is such that "the screen is darkened to temporarily prevent the windows other than the window for the promoting operation from being operated". On the screen for the promoting operation, only ID/passwords input fields, a button for "OK"/"cancel" selection, and the like are disposed. The user can easily recognize such a UI as the SUI. Meanwhile, when a multi-functional UI is allowed to be implemented as the SUI, it is difficult for the user to identify that the UI is an UI of a normal application.

Next, a description will be given of a second problem to be solved in implementing the TA in the security module as the SUI. In this case, a problem arises in that cost required for implementing the SUI is increased.

The implementation of the TA operating in the security module requires cost higher than that required by implementation of an application operating on a "rich OS" outside the security module. This is because development/test environments (such as SDK (Software Development Kit)), usable computer resources (such as a CPU (Central Processing Unit) and a memory), usable sub-modules (such as a service and a library), and the like are limited compared to those usable in the development of the application on the rich OS.

In addition, in a configuration in which the TA is implemented, a need to further implement a processing mechanism required to operate as the TA, such as encryption or authentication, is likely to arise. Accordingly, cost for implementing a highly functional SUI is increased. For the same reason, maintenance cost is also increased.

The present invention is achieved in view of the foregoing, and an object of the present invention is to provide an information processing apparatus having a user interface that allows a user to confirm that input/output information is not falsified in an information transmission path irrespective of an amount of information to be displayed, an information processing system, and an information processing method.

[Means for Solving the Problem]

To solve the problems described above and attain the object, an information processing apparatus according to the present invention includes: a first software functional unit; a second software functional unit having a protection level higher than that of the first software functional unit; and an input/output unit that receives an input of information and displays and outputs the information. The first software functional unit includes: a first input/output control unit that causes the input/output unit to display a first screen which receives at least an input of a first query and transmits, as a second query, the first query input via the first screen to the second software functional unit. The second software functional unit includes: a production unit that produces a second summary corresponding to the second query on the basis of certification data including a query and a summary corresponding to the query; and a second input/output control unit that causes the input/output unit to display a second screen having the second query and the second summary.

An information processing system according to the present invention includes: a first information processing apparatus including a first software functional unit and a second software functional unit having a protection level higher than that of the first software functional unit; and a second information processing apparatus including a third software functional unit having a protection level higher than that of the first software functional unit. The first information processing apparatus further includes: an input/output unit that receives an input of information and displays and outputs the information. The first software functional unit includes: a first input/output control unit that causes the input/output unit to display a first screen which receives at least an input of a first query and transmits, as a second query, the first query input via the first screen to the first software functional unit. The second software functional unit includes: a verification unit that gives a request to produce a second summary corresponding to the second query and verifies integrity of the second summary transmitted in response to the request; and a second input/output control unit that causes the input/output unit to display a second screen having the second query and the second summary. The third software functional unit includes: a storage unit that stores certification data including a query and a summary corresponding to the query in a state in which integrity of the certification data is verifiable; and a production unit that searches the certification data on the basis of the second query in response to the request from the verification unit, produces the second summary on the basis of a result of the search, and transmits the second summary to the verification unit.

[Effects of the Invention]

According to the present invention, it is possible to provide an information processing apparatus including a user interface that allows a user to confirm that input/output information is not falsified in an information transmission path irrespective of an amount of information to be displayed, an information processing system, and an information processing method.

DESCRIPTION OF EMBODIMENTS

Figure 1:
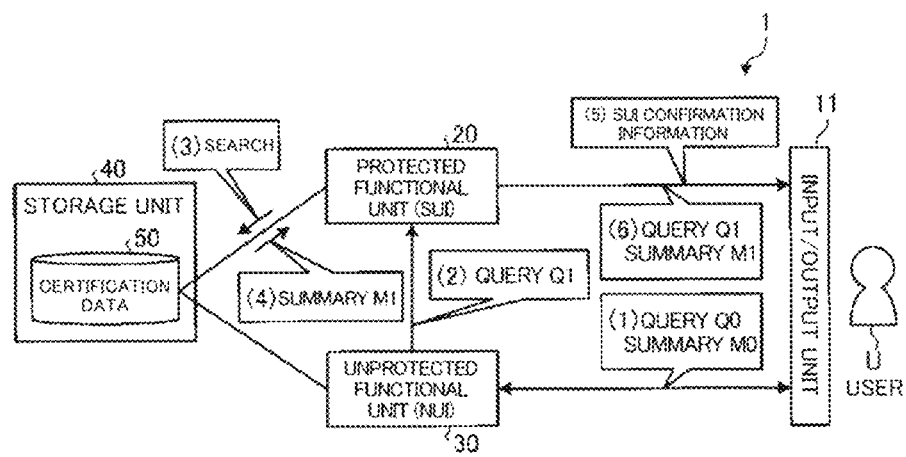
FIG. 1 is a diagram illustrating a configuration of a main portion of an information processing apparatus according to an embodiment.

Referring to the drawings, an embodiment of the present invention will be described below in detail. Note that the embodiment is not intended to limit the present invention. In the illustration of the drawings, the same parts are denoted by the same reference numerals.

Embodiment

A description will be given of the present embodiment.

The embodiment proposes a SUI confirmation method by which, even when a program displays a result of processing a large amount of information, such as a result of confirming a security check, in response to an input request from a user, the user is allowed to confirm that input/output information is not falsified in an information transmission path from the program to the user.

[Configuration of Main Portion of Information Processing Apparatus]

First, a description will be given of a configuration of a main portion of an information processing apparatus and an information processing method each according to the present embodiment. FIG. 1 is a diagram illustrating the configuration of the main portion of the information processing apparatus according to the embodiment. An information processing apparatus 1 according to the embodiment is realized by causing a computer including a ROM (Read Only Memory), a RAM (Random Access Memory), a CPU, and so forth, or the like to read a predetermined program and causing the CPU to execute the predetermined program. The information processing apparatus 1 also includes an NIC (Network Interface Card) or the like to be able to perform communication with another apparatus via an electric communication line such as a LAN (Local Area Network) or the Internet.

As illustrated in FIG. 1, the information processing apparatus 1 according to the embodiment includes at least an input/output unit 11, a protected functional unit (SUI functional unit) 20 (second software functional unit), an unprotected functional unit (normal user interface (NUI) functional unit) (first software functional unit) 30, and a storage unit 40.

The input/output unit 11 receives an input of information through an operation by the user and displays and outputs the information to present the information to the user. The input/output unit 11 is configured to include a display device such as a display and an input device such as a keyboard or a mouse. Alternatively, the input/output unit 11 may also be an input/output device using a touch panel system.

The SUI functional unit 20 includes an OS and an application program protected equally to the OS. Compared to the SUI functional unit 20, the NUI functional unit 30 has a level of protection from malware or an unauthorized operation lower than a protection level of the SUI functional unit 20. In other words, the protection level of the SUI functional unit 20 is higher than the protection level of the NUI functional unit 30.

The storage unit 40 stores certification data 50. The certification data 50 includes a query and a summary corresponding to the query.

[Flow of Processing]

Figure 2:
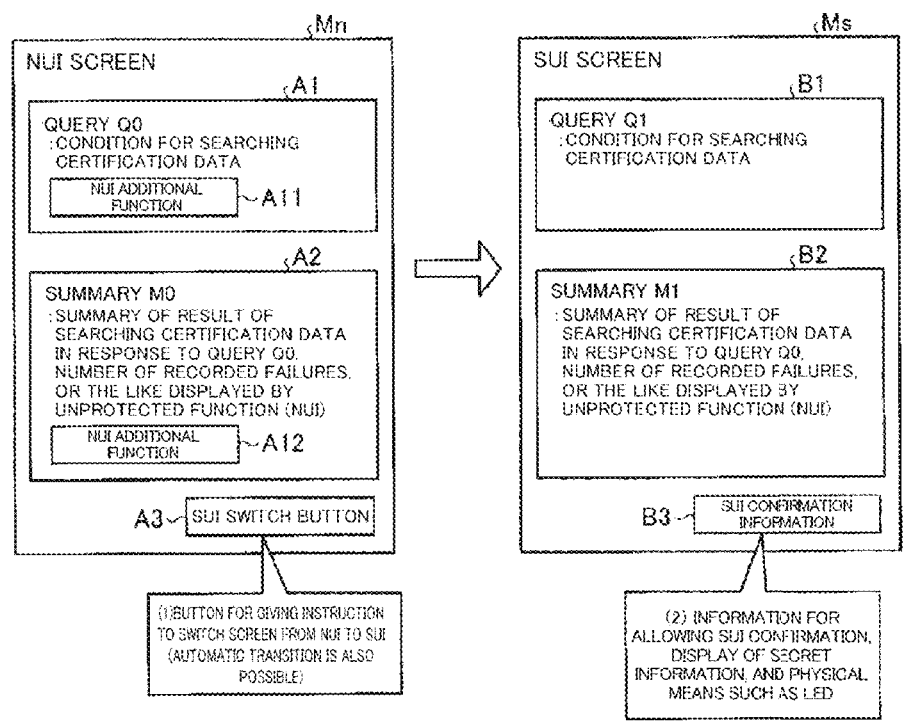
FIG. 2 is a diagram illustrating an example of a screen displayed by an input/output unit illustrated in FIG. 1.

Next, referring to FIGS. 1 and 2, a description will be given of a flow of processing in the information processing apparatus 1. FIG. 2 is a diagram illustrating an example of a screen displayed by the input/output unit 11 illustrated in FIG. 1. It is assumed that a query Q0 (first query) is known and manually input by the user.

First, in a first step, the NUI functional unit 30 causes the input/output unit 11 to display a NUI screen Mn (first screen) (see FIG. 2) which receives an input of the query Q0 (first query) and receives the input of the query Q0. The query Q0 is a condition for searching the certification data 50. For example, the NUI screen Mn has an input region A1 for the query Q0, and the NUI functional unit 30 receives the input of the query Q0 by keyboard entry or the like to the input region A1 in the NUI screen Mn.

In general, the input query Q0 is displayed on the input region A1 of the NUI screen Mn simultaneously with the inputting of the query Q0. On the input region A1 of the NUI screen Mn, a NUI additional function field A11 is displayed. For example, the NUI additional function field A11 displays a function of supporting inputting/outputting of a query such as display of a menu of values or input autocompletion, and is realized by implementing the NUI functional unit 30.

In general, the NUI functional unit 30 searches the certification data 50 on the basis of the query Q0 and also displays a summary M0 corresponding to a search result on the display region A2 of the NUI screen Mn. The summary M0 includes a summary of a result of searching the certification data 50 in response to the query Q0, which is displayed on the NUI screen Mn, the number of recorded failures, and the like. On the display region A2 of the NUI screen Mn, a NUI additional function field A12 is displayed together with a summary M1. The NUI additional function field 12 displays a function of allowing original data (recorded failure data) of the summary (number of recorded failures) to be viewed and a function of allowing details of the summary M0 to be referenced such as, e.g., scrolling, sorting, or attribute-based searching, and is realized by implementing the NUI functional unit 30.

Thus, in the information processing apparatus 1, NUI additional functions illustrated by way of example in the NUI additional function fields A11 and A12 are implemented in the NUI functional unit 30. Therefore, compared to a case where functions are implemented in the SUI functional unit 20, it is possible to easily provide highly functional input/output display. Consequently, the information processing apparatus 1 allows the user to recognize the following information by referencing the NUI additional function fields A11 and A12. The following information mentioned above includes the function of supporting inputting/outputting of a query such as display of a menu of values or input autocompletion, the function of allowing the original data of the summary to be viewed, and the result of processing of a large amount of data representing details of the summary, such as scrolling, sorting, and attribute-based searching.

The user uses the NUI functional unit 30 to repeat correction of the query and checking of the summary as necessary to determine the query Q0 and the summary M0 of a target item to be confirmed using the SUI. Information displayed on the input/output unit 11 (recognized by the user) at this stage is assumed to be the query Q0 and the summary M0. The NUI functional unit 30 receives inputs of the query Q0 and the summary M0 via the NUI screen Mn (see (1) of FIG. 1). It may also be possible that, at this stage, only the query Q0 is input.

Since the NUI functional unit 30 corresponds to an unprotected function, it may be possible that information is falsified in any of processing paths associated with the NUI functional unit 30, and the summary M0 is not a correct response to the query Q0. This is a first threat.

Subsequently, in a second step, the NUI functional unit 30 gives an instruction to perform a display switch from the NUI screen Mn to a SUI screen Ms (see FIG. 2). In general, a SUI switch button A3 (see FIG. 2) is displayed on the NUI screen Mn and, through selection of the SUI switch button A3 by the user or the like, the display switch to the SUI screen Ms (see FIG. 2) provided by the SUI functional unit 20 is performed. The display switch to the SUI screen Ms may also be performed automatically when the query Q0 is input to the NUI functional unit 30, not by an operation by the user.

At this time, since the NUI screen Mn is not protected, the instruction to perform the display switch may be falsified. It is possible that the display switch to the SUI screen Ms is cancelled, and a third step for a transition may be pretended. This is a second threat.

Then, in the third step, the NUI functional unit 30 transmits, as a query Q1 (second query), the query Q0 input via the NUI screen Mn to the SUI functional unit 20 (see (2) of FIG. 1). Since the NUI functional unit 30 is not protected, it is possible that the transmitted query Q1 does not match the query Q0 recognized by the user. This is a third threat.

Subsequently, in a fourth step, the SUI 30 searches the certification data on the basis of the query Q1 (see (3) of FIG. 1) to acquire the summary M1 corresponding to the query Q1 (see (4) of FIG. 1). To a method of acquiring the summary M1, various methods are applicable. Since the SUI functional unit 20 is protected, a correspondence relationship between the query Q1 and the summary M1 is reliable.

Then, in a fifth step, the SUI functional unit 20 produces a SUI screen including the query Q1 and the summary M1. Subsequently, in a sixth step, the SUI functional unit 20 displays the SUI screen Ms. When causing the input/output unit 11 to display the SUI screen Ms, the SUI functional unit 20 adds a display function (e.g., SUI confirmation information B3) of allowing the user to confirm whether or not the SUI screen Ms is protected (see FIG. 2) (see (5) of FIG. 1).

For example, the SUI functional unit 20 not only displays a display function of darkening the screen and temporarily preventing windows other than a window for a promoting operation from being operated and secret information knowable only by the user, but also adds a display function of turning ON a physical means such as an LED lamp operable only by a program in a security module or the like (see FIG. 2). When recognition of the SUI confirmation information is successful due to these display functions, the user can confirm that the second threat has not arisen. Meanwhile, when the recognition of the SUI confirmation information is unsuccessful, the user can recognize the possibility that the second threat has arisen, and therefore advances to incident handling.

The SUI screen Ms displayed by the SUI functional unit 20 includes the query Q1 and the summary M1 (see (6) of FIG. 1). Specifically, the SUI functional unit 20 causes the input/output unit 11 to display the SUI screen Ms (see FIG. 2) having a display region B1 for the query Q1 and a display region B2 for the summary M1. The query Q1 serves as a condition for searching the certification data 50. The summary M1 includes a summary of the result of searching the certification data 50 in response to the query Q1, the number of recorded failures, and the like.

It is to be noted herein that the query Q0 displayed on the MUI screen Ms and the query Q1 and the summary M1 each displayed on the SUI screen Ms are information to be used in determining the presence or absence of falsification of input/output information in an information transmission path extending from the input/output unit 11 through the NUI functional unit 30. In other words, when the query Q0 and the summary M0 each recognized by the user have the same values as those of the query Q1 and the summary M1 each displayed on the SUI screen Ms, the user can confirm that the first threat and the third threat have not arisen. When the query Q0 and the summary M0 do not have the same values as those of the query Q1 and the summary M1 each displayed on the SUI screen Ms, the user can recognize the possibility that the first threat or the third threat has arisen, and therefore advances to the incident handling.

[Processing Procedure of Information Processing]

Figure 3:
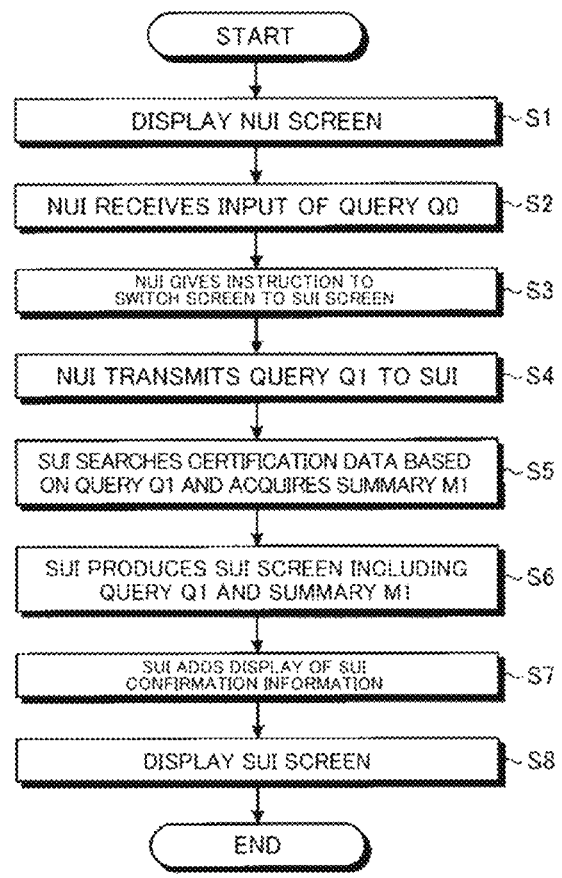
FIG. 3 is a flow chart illustrating a processing procedure of information processing according to the embodiment.

Next, a description will be given of a processing procedure of information processing according to the embodiment. FIG. 3 is a flow chart illustrating the processing procedure of the information processing according to the embodiment.

First, the NUI functional unit 30 produces the NUI screen which receives the input of the query Q0, and gives an instruction to display the NUI screen to the input/output unit 11 (Step S1) to cause the input/output unit 11 to display the NUI screen. The NUI functional unit 30 receives the input of the query Q0 from the user via the NUI screen (Step S2). Then, the NUI functional unit 30 gives, to the input/output unit 11, an instruction to perform a display switch from the NUI screen to the SUI screen (Step S3). Subsequently, the NUI functional unit 30 transmits, as the query Q1, the query Q0 input via the NUI screen to the SUI functional unit 20 (Step S4).

Subsequently, the SUI functional unit 20 searches the certification data 50 on the basis of the query Q1 and acquires the summary M1 corresponding to the query Q1 (Step S5). The SUI functional unit 20 produces screen information of the SUI screen including the query Q1 and the summary M1 (Step S6), and gives an instruction to display the SUI screen to the input/output unit 11 (Step S7).

At this time, the SUI functional unit 20 adds the SUI confirmation information (Step S8), and causes the SUI confirmation information to be displayed. By checking the SUI confirmation information, the user can recognize whether or not there is a possibility that the SUI screen is pretended. When recognizing the possibility that the SUI screen is pretended, the user advances to the incident handling.

On the basis of whether or not the query Q0 and the summary M0 each recognized by the user have the same values as those of the query Q1 and the summary M1 each displayed on the SUI screen Ms, the user can recognize whether or not there is a possibility that the input/output path associated with the NUI functional unit 30 is falsified. When successfully recognizing that the query Q0 and the summary M0 have the same values as those of the query Q1 and the summary M1 each displayed on the SUI screen Ms, the user can recognize that there is no possibility (first and third threats) that the input/output path associated with the NUI functional unit 30 is falsified. When recognizing that the query Q0 and the summary M0 do not have the same values as those of the query Q1 and the summary M1 each displayed on the SUI screen Ms, the user can recognize the possibility that the input/output path associated with the NUI functional unit 30 is falsified, and therefore advances to the incident handling.

Effects of Embodiment

Figure 4:
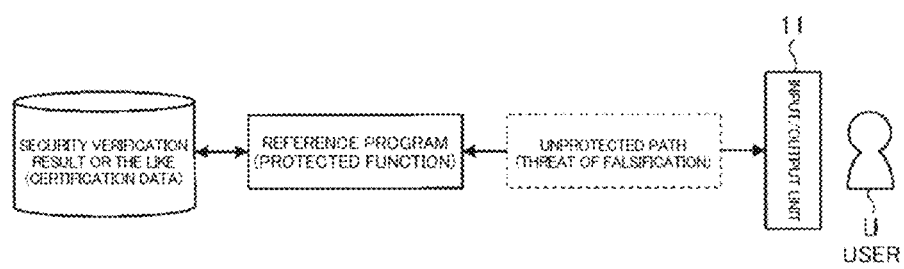
FIG. 4 is a diagram illustrating effects of the present embodiment.

Thus, the information processing apparatus 1 according to the embodiment implements the NUI functional unit 30 such that the result of processing the large amount of data is viewable on the NUI screen Ms of the NUI functional unit 30, and displays the NUI screen Mn. Then, the information processing apparatus 1 allows the user to compare the SUI screen Ms provided by the SUI functional unit 20 to the NUI screen Mn provided by the NUI functional unit and thus recognize that the input/output information is not falsified in the information transmission path including an unprotected path (see FIG. 4). In the embodiment, the SUI screen Ms provided by the SUI functional unit 20 is localized, and therefore the user can determine the presence or absence of falsification of the input/output information even though the functions that can be implemented in the SUI functional unit 20 are limited.

In other words, according to the present embodiment, it is possible to provide the user interface that allows the user to confirm that the input/output information is not falsified in the information transmission path including the unprotected path irrespective of the amount of information to be displayed.

Note that, in the present embodiment, the case where the NUI screen Mn and the SUI screen Ms are switchably displayed has been described by way of example, but the display of the NUI screen Mn and the SUI screen Ms is not limited thereto. For example, the information processing apparatus 1 may also cause the input/output unit 11 to display the NUI screen Mn and the SUI screen Ms in parallel so as to allow the user to easily compare the query Q0 to the summaries M0 and M1.

FIRST EXAMPLE

Figure 5:
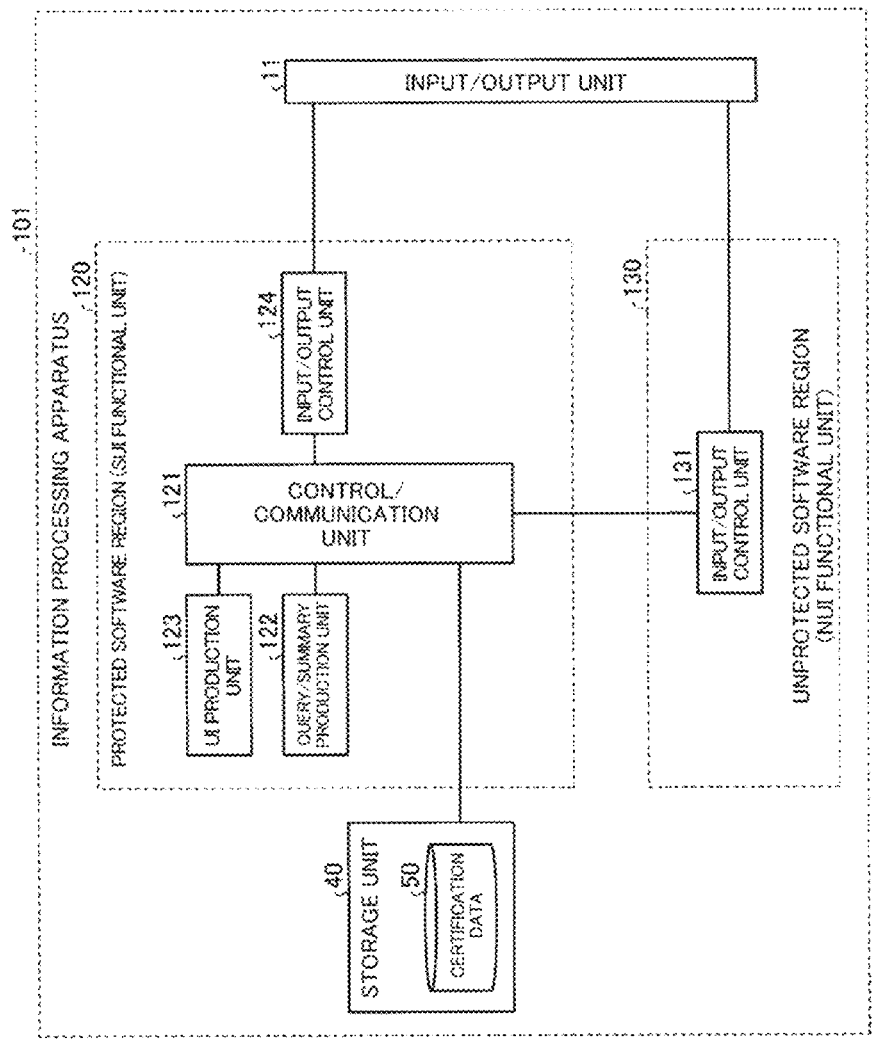
FIG. 5 is a diagram illustrating an example of a configuration of an information processing apparatus according to a first example.

Next, a description will be given of a first example. The first example is an example when the first conventional technique is applied to the SUI confirmation method in which, for the sake of ease, the number of components in an unprotected software region is minimized. FIG. 5 is a diagram illustrating an example of a configuration of an information processing apparatus according to the first example.

It is assumed herein that an information processing apparatus 101 according to the first example is a protected hardware apparatus and, due to countermeasures taken against falsification, such as placement of the information processing apparatus 101 in a safe room, there is no hardware falsification. The same assumption applies also to information processing apparatuses subsequently described in second to fourth examples. The information processing apparatus 101 is realized by causing a computer including a ROM, a RAM, a CPU, and so forth, or the like to read a predetermined program and causing the CPU to execute the predetermined program. The information processing apparatus 101 also includes an NIC to be able to perform communication with another apparatus via an electric communication line such as a LAN or the Internet. Each of the information processing apparatuses subsequently described in the second to fourth examples is similarly realized.

As illustrated in FIG. 5, the information processing apparatus 101 at least includes a protected software region (SUI functional unit) 120 (second software functional unit), an unprotected software region (NUI functional unit) 130 (first software functional unit), and the storage unit 40.

The storage unit 40 stores the certification data 50 in a state in which integrity of the certification data 50 is verifiable. For example, by adding a digital signature to the certification data 50, it is possible to retroactively sense falsification or prove that no falsification is performed. When the certification data 50 includes a large number of data sets such as a logs, by adding hash chain data representing a hash value of a previous log to each of the logs, it is possible to also sense log-based partial depletion.

The NUI functional unit 130 is an application program other than the SUI functional unit 120, and has a lower level of protection from malware or an unauthorized operation than the protection level of the SUI functional unit 120. The NUI functional unit 130 has an input/output control unit 131 (first input/output control unit).

The input/output control unit 131 causes the input/output unit 11 to display a NUI screen (e.g., the NUI screen Mn in FIG. 2) for receiving at least an input of the query Q0. The input/output control unit 131 transmits, as the query Q1, the query Q0 input via the NUI screen Mn to the SUI functional unit 120. Since the NUI functional unit 130 is not an unprotected function, the query Q0 and the summary M0 may possibly be falsified in any of processing paths extending through the input/output control unit 131 (first threat). Specifically, malware in the NUI functional unit 130 may possibly falsify the TIN (password). In this case, a user cannot be promoted to a privileged user, which interrupts a service operation.

The SUI functional unit 120 corresponds to an OS and an application program protected equally to the OS. The SUI functional unit 120 is protected by secure boot or the like. The SUI functional unit 120 includes a control/communication unit 121, a query/summary production unit 122 (production unit), a UI production unit 123, and an input/output control unit 124 (second input/output control unit).

The control/communication unit 121 controls a function of each of components of the SUI functional unit 120, and also controls communication with another apparatus.

The query/summary production unit 122 produces the summary M1 corresponding to the query Q0 on the basis of the certification data 50. The query/summary production unit 122 searches the certification data 50 on the basis of the query Q1, and produces the summary M1 on the basis of a result of the search of which integrity is verified.

The UI production unit 123 produces a NUI screen (e.g., the NUI screen Mn in FIG. 2) and a SUI screen (e.g., the SUI screen Ms in FIG. 2) which are to be displayed on the input/output unit 11. In the first example, the UI production unit 123 produces both of the SUI screen and the NUI screen. Note that, as stated previously, the SUI screen is protected, but the NUI screen is not protected. The SUI screen is a screen merely displaying the query Q1 and the summary M1 on one screen. The NUI screen is a screen which provides a multifunctional screen including query input support, a reference to details of the summary, and the like.

The input/output control unit 124 controls input/output information between the input/output unit 11 and the control/communication unit 121. The input/output control unit 124 causes the SUI screen to be displayed. At this time, the input/output control unit 124 adds, to the SUI screen, SUI confirmation information which allows the user to confirm whether or not the SUI screen is protected.

For example, the input/output control unit 124 adds, to the SUI screen, a display function of "darkening the screen and temporarily preventing windows other than a window for a promoting operation from being operated" which allows the user to determine the presence or absence of faked display of a TOUT (e.g., a password input screen). This function can prevent the user from inputting a password to malware and prevent a password of a privileged user serving as a basis for the security of the apparatus from being stolen by the malware.

[Flow of Processing]

Figure 6:
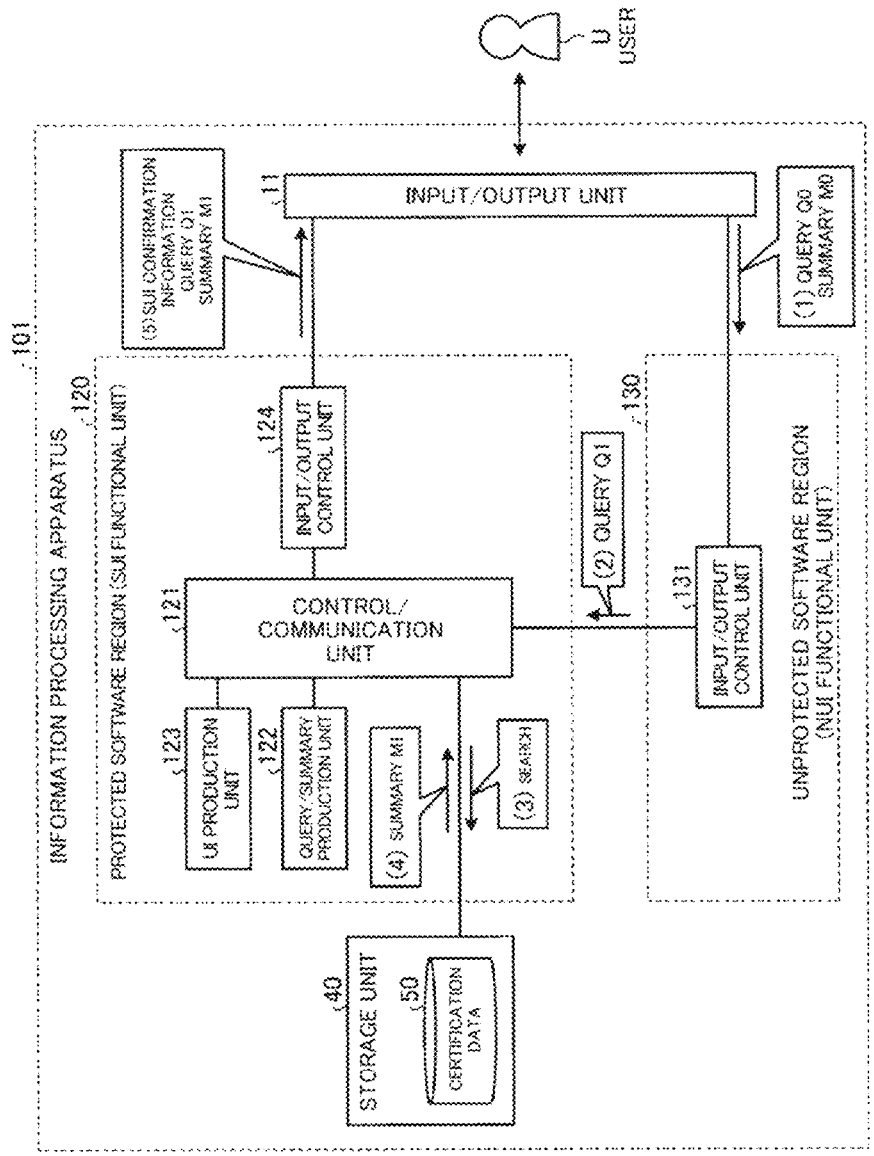
FIG. 6 is a chart illustrating a flow of processing in the information processing apparatus illustrated in FIG. 5.

Next, a description will be given of a flow of processing in the information processing apparatus 101. FIG. 6 is a chart illustrating the flow of the processing in the information processing apparatus 101 illustrated in FIG. 5.

First, the NUI functional unit 130 displays the NUI screen, and receives inputs of the query Q0 and the summary M0 (see (1) of FIG. 6). It may also be possible that, at this stage, only the query Q0 is input. In other words, the user inputs at least the query Q0 via the input/output control unit 131. Screen information of the NUI screen is produced by the UI production unit 123 of the SUI functional unit 120, and query/summary information included in the screen is generated by the protected query/summary production unit 122 by searching the storage unit 40. However, since the input/output control unit 131 of the NUI functional unit 130 is not protected, the summary M1 may possibly be falsified, and the first threat described above exists.

Next, the NUI functional unit 130 gives an instruction to perform a display switch to the SUI screen provided by the SUI functional unit 120. The user gives an instruction to switch the screen via the input/output control unit 131 of the NUI functional unit 130. Note that, since the input/output control unit 131 is not protected, the instruction to switch the screen may possibly be falsified, and the second threat of cancellation of the screen switch to the SUI screen and pretense of the third step for a transition may possibly arise.

The input/output control unit 131 of the NUI functional unit 130 transmits, as the query Q1, the query Q0 input to the control/communication unit 121 of the SUI functional unit 120 via the NUI screen (see (2) of FIG. 6). Note that, since the input/output control unit 131 is not protected, the third threat of a mismatch between the transmitted query Q1 and the query Q0 recognized by the user may possibly arise.

The SUI functional unit 120 acquires the summary M1 corresponding to the query Q1. The control/communication unit 121 transmits the query Q1 to the query/summary production unit 122, and produces the summary M1 corresponding to the query Q1. The query/summary production unit 122 searches the certification data on the basis of the query Q1 via the control/communication unit 121 (see (3) of FIG. 6), and produces the summary M1 corresponding to the query Q1 (see (4) of FIG. 6). The query Q1 may possibly have been falsified, but a correspondence relationship between the query Q and the produced summary M1 is reliable.

Then, in the SUI functional unit 120, the UI production unit 123 produces screen information of the SUI screen including the query Q1 and the summary M1. In the SUI functional unit 120, the input/output control unit 124 adds, to the SUI screen, display of the SUI confirmation information which allows the user to confirm whether or not the SUI screen is protected when the input/output control unit 124 causes the input/output unit 11 to display the SUI screen including the query Q1 and the summary M1 (see (5) of FIG. 6). For example, the input/output control unit 124 adds, as the SUI confirmation information, the display function of "darkening the screen and temporarily preventing the windows other than the window for the promoting operation from being operated".

When the recognition of the SUI confirmation information is successful, the user can confirm that the second threat has not arisen. Meanwhile, when the recognition of the SUI confirmation information is unsuccessful, the user can recognize the possibility that the second threat has arisen, and therefore advances to incident handling.

Then, by checking the SUI screen, the user can recognize that the first threat and the third threat have not arisen when the query Q0 and the summary M0 each recognized by the user have the same values as those of the query Q1 and the summary M1 each displayed on the SUI screen. When the query Q0 and the summary M0 do not have the same values as those of the query Q1 and the summary M1 each displayed on the SUI screen, the user can recognize the possibility that the first threat or the third threat has arisen, and therefore advances to the incident handling.

[Processing Procedure of Information Processing]

Figure 7:
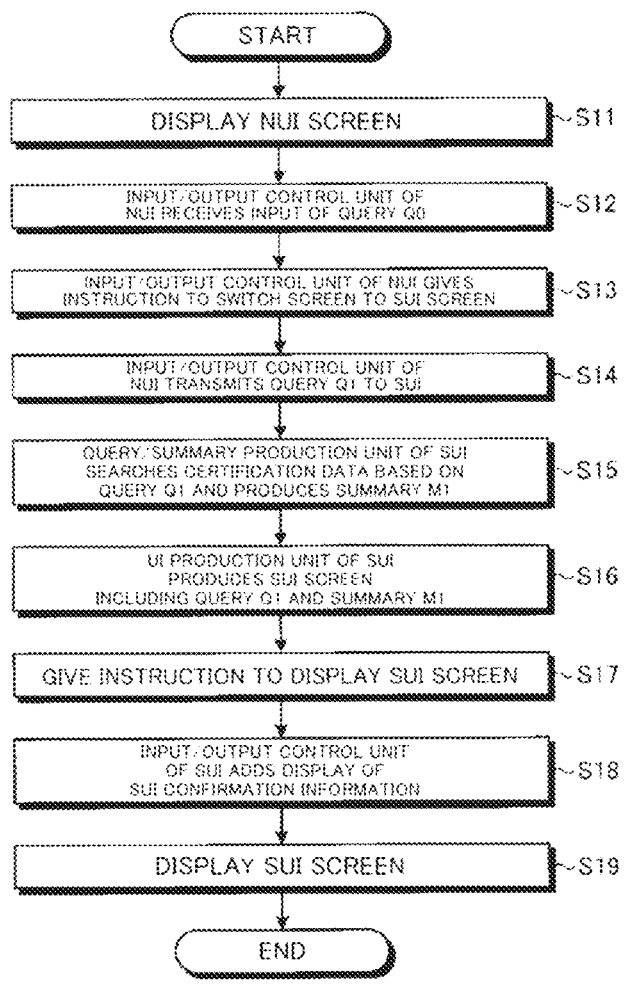
FIG. 7 is a flow chart illustrating a processing procedure of information processing according to the first example.

Next, a description will be given of a procedure of information processing according to the first example. FIG. 7 is a flow chart illustrating the processing procedure of the information processing according to the first example.

First, the input/output control unit 131 causes the input/output unit 11 to display the NUI screen (Step S11). In the NUI functional unit 130, the input/output control unit 131 receives the input of the query Q0 from the user via the NUI screen (Step S12). Then, in the NUI functional unit 130, the input/output control unit 131 gives, to the input/output unit 11, an instruction to perform a display switch from the NUI screen to the SUI screen (Step S13). Subsequently, in the NUI functional unit 130, the input/output control unit 131 transmits, as the query Q1, the query Q0 input via the NUI screen to the SUI functional unit 120 (Step S14).

Subsequently, in the SUI functional unit 120, the query/summary production unit 122 searches the certification data 50 on the basis of the query Q1, and produces the summary M1 corresponding to the query Q1 (Step S15). In the SUI functional unit 120, the UI production unit 123 produces the screen information of the SUI screen including the query Q1 and the summary M1 (Step S16), and the control/communication unit 121 gives, to the input/output unit 11, an instruction to display the SUI screen (Step S17).

At this time, in the SUI functional unit 120, the input/output control unit 124 adds the SUI confirmation information (Step S18), and causes the input/output unit 11 to display the SUI screen in a state in which the SUI confirmation information is added (Step S19).

By applying the configuration of the first example, it is possible to minimize the number of the components in the unprotected software region, while applying the first conventional technique to the SUI confirmation method.

SECOND EXAMPLE

Figure 8:
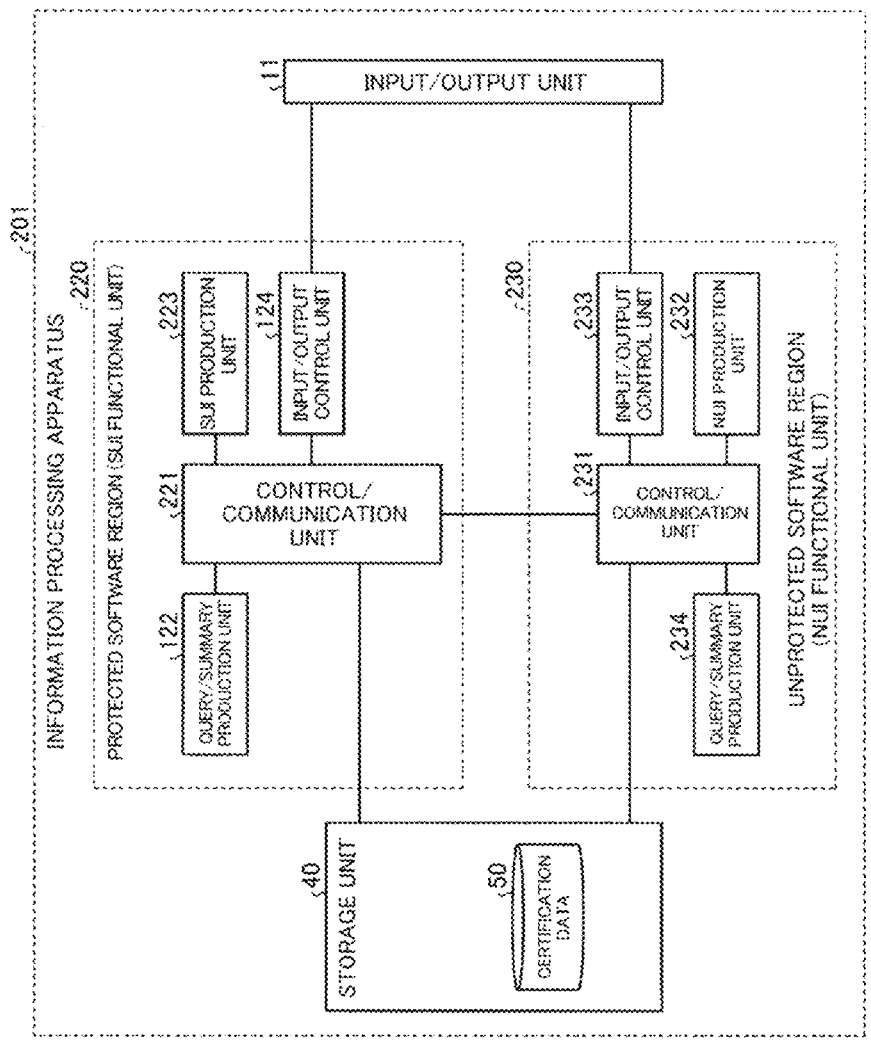
FIG. 8 is a diagram illustrating an example of a configuration of an information processing apparatus according to a second example.

Next, a description will be given of a second example. The second example is an example when the first conventional technique is applied to the SUI confirmation method in which the number of the components in the unprotected software region is increased compared to that in the first example. FIG. 8 is a diagram illustrating an example of a configuration of an information processing apparatus according to the second example.

As illustrated in FIG. 8, in an information processing apparatus 201, an unprotected software region (NUI functional unit) 230 (first software functional unit) includes, in addition to an input/output control unit 233 (first input/output control unit), a control/communication unit 231, a NUI production unit 232, and a query/summary production unit 234.

The control/communication unit 231 controls a function of each of components of the NUI functional unit 230, and also controls communication with another apparatus.

The NUI production unit 232 produces a NUI screen (e.g., the NUI screen Mn illustrated in FIG. 2). As described above, the NUI screen can provide a large amount of multi-functional information such as query input support and a reference to details of the summary.

The input/output control unit 233 controls input/output information between the input/output unit 11 and the control/communication unit 231. In the same manner as in the first example, the input/output information may possibly be falsified (first threat). The input/output control unit 233 causes the input/output unit 11 to display the NUI screen produced by the NUI production unit 232, and receives an input of the query Q0 or the like. The input/output control unit 233 outputs, as the query Q1, the received query Q0 to a protected software region (SUI functional unit) 220 via the control/communication unit 231.

The query/summary production unit 234 searches the certification data 50 in the storage unit 40 on the basis of the query Q0 (search condition), and produces the summary M0 from a result of the search. Note that, at this time, it is not necessarily required to verify integrity of the certification data.

The SUI functional unit 220 (second software functional unit) includes a control/communication unit 221 having the same function as that of the control/communication unit 121, the query/summary production unit 122, the SUI production unit 223, and the input/output control unit 124.

The SUI production unit 223 produces a SUI screen (see, e.g., the SUI screen Ms in FIG. 2). In the present second example, the NUI production unit 232 produces the NUI screen, and accordingly the SUI production unit 223 produces only the SUI screen which is a screen merely displaying the query Q1 and the summary M1 on one screen.

[Flow of Processing]

Figure 9:
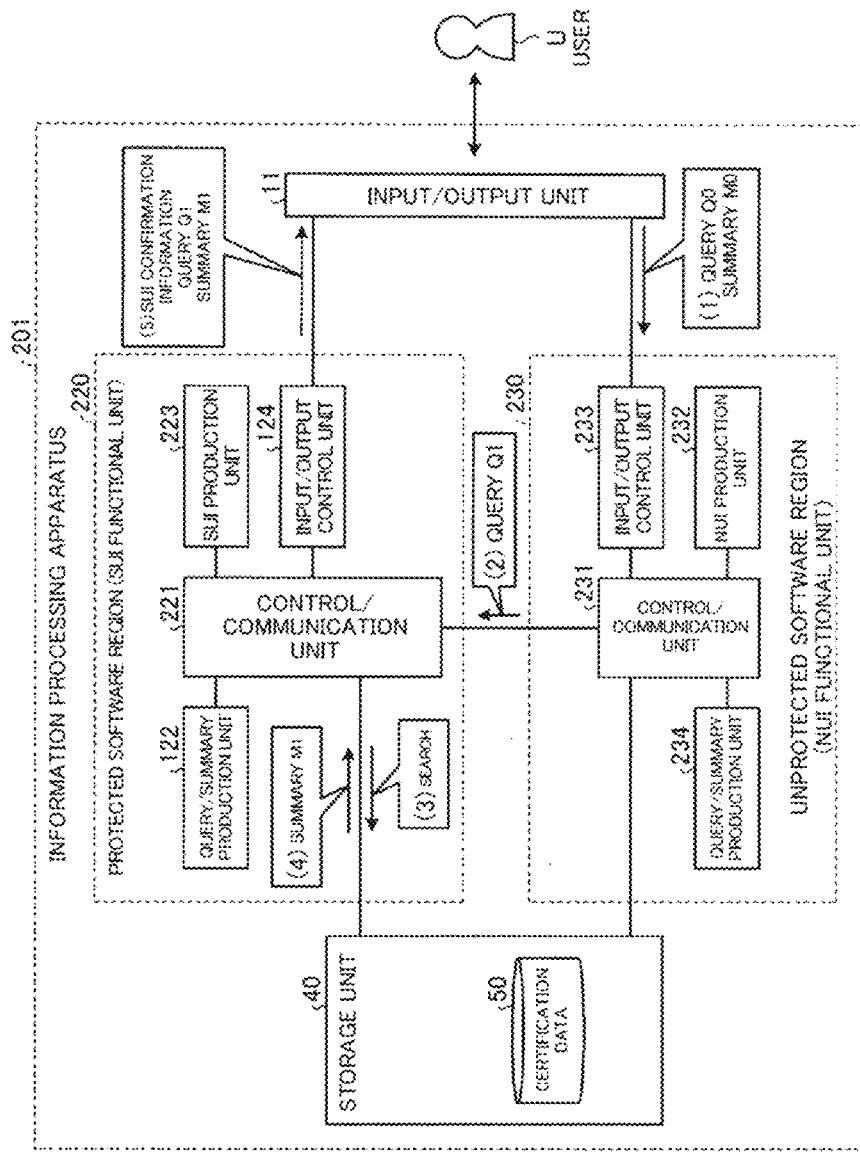
FIG. 9 is a chart illustrating a flow of processing in the information processing apparatus illustrated in FIG. 8.

Next, a description will be given of a flow of processing in the information processing apparatus 201. FIG. 9 is a chart illustrating a flow of processing in the information processing apparatus 201 illustrated in FIG. 8.

First, in the NUI functional unit 230, the NUI production unit 232 produces the NUI screen, and the input/output control unit 233 causes the input/output unit 11 to display the NUI screen. In the NUI functional unit 230, the input/output control unit 233 receives an input of the query Q0 and the summary M0 (see (1) of FIG. 9). Since the input/output control unit 233 of the NUI functional unit 230 is not protected herein, the first threat may possibly arise.

Then, the NUI functional unit 230 gives an instruction to perform a display switch to the SUI screen provided by the SUI functional unit 220. The user gives an instruction to switch the screen via the input/output control unit 233 of the NUI functional unit 230. Note that, since the input/output control unit 233 is not protected, the second threat may possibly arise.

The input/output control unit 233 of the NUI functional unit 230 transmits, as the query Q1, the query Q0 input via the NUI screen to the control/communication unit 221 of the SUI functional unit 220 via the control/communication unit 231 (see (2) of FIG. 9). Note that, since the input/output control unit 233 and the control/communication unit 231 are not protected, the third threat may possibly arise.

The SUI functional unit 220 acquires the summary M1 corresponding to the query Q1. The control/communication unit 221 transmits the query Q1 to the query/summary production unit 122, and produces the summary M1 corresponding to the query Q1. The query/summary production unit 122 searches the certification data based on the query Q1 via the control/communication unit 221 (see (3) of FIG. 9), and produces the summary M1 corresponding to the query Q1 (see (4) of FIG. 9). The query Q1 may possibly have been falsified, but a correspondence relationship between the query Q1 and the produced summary M1 is reliable.

Then, in the SUI functional unit 220, the SUI production unit 223 produces screen information of the SUI screen including the query Q1 and the summary M1. Subsequently, in the SUI functional unit 220, when the input/output control unit 124 causes the input/output unit 11 to display the SUI screen including the query Q1 and the summary M1, the input/output control unit 124 adds, to the SUI screen, display of SUI confirmation information (see (5) of FIG. 9). For example, the input/output control unit 124 adds, as the SUI confirmation information, a display function of "darkening the screen and temporarily preventing windows other than a window for a promoting operation from being operated".

In the same manner as in the first example, when the recognition of the SUI confirmation information is successful, the user can confirm that the second threat has not arisen. Meanwhile, when the recognition of the SUI confirmation information is unsuccessful, the user can recognize the possibility that the second threat has arisen, and therefore advances to incident handling.

Then, by checking the SUI screen, the user can recognize that the first threat and the third threat have not arisen when the query Q0 and the summary M0 each recognized by the user have the same values as those of the query Q1 and the summary M1 each displayed on the SUI screen. When the query Q0 and the summary M0 do not have the same values as those of the query Q1 and the summary M1 each displayed on the SUI screen, the user can recognize the possibility that the first threat or the third threat has arisen, and therefore advances to the incident handling.

[Processing Procedure of Information Processing]

Figure 10:
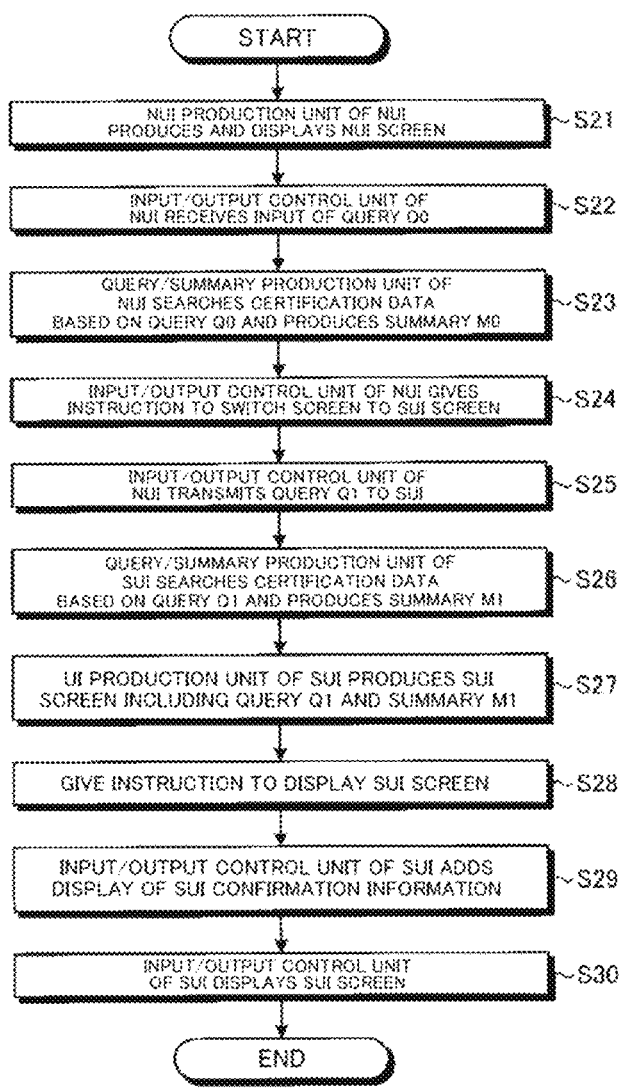
FIG. 10 is a flow chart illustrating a processing procedure of information processing according to the second example.

Next, a description will be given of a procedure of information processing according to the second example. FIG. 10 is a flow chart illustrating the processing procedure of the information processing according to the second example.

First, in the NUI functional unit 230, the NUI production unit 232 produces the NUI screen, and the input/output control unit 233 causes the input/output unit 11 to display the NUI screen (Step S21). In the NUI functional unit 230, the input/output control unit 233 receives an input of the query Q0 from the user via the NUI screen (Step S22). Then, in the NUI functional unit 230, the query/summary production unit 234 searches the certification data 50 on the basis of the query Q0, and produces the summary M0 (Step S23). The control/communication unit 231 gives an instruction to perform a display switch from the NUI screen to the SUI screen (Step S24). Subsequently, in the NUI functional unit 230, the input/output control unit 233 transmits, as the query Q1, the query Q0 input via the NUI screen to the SUI functional unit 220 via the control/communication unit 231 (Step S25).

In the SUI functional unit 220, the query/summary production unit 122 searches the certification data 50 on the basis of the query Q1, and produces the summary M1 corresponding to the query Q1 (Step S26). In the SUI functional unit 220, the SUI production unit 223 produces the screen information of the SUI screen including the query Q1 and the summary M1 (Step S27), and the control/communication unit 221 gives, to the input/output control unit 124, an instruction to display the SUI screen (Step S28). At this time, in the SUI functional unit 220, the input/output control unit 124 adds the SUI confirmation information (Step S29), and causes the input/output unit 11 to display the SUI screen in a state in which the SUI confirmation information is added (Step S30).

As in the configuration of the second example, it is also possible to increase the number of the components in the unprotected software region compared to that in the first example, while applying the first conventional technique to the SUI confirmation method.

THIRD EXAMPLE

Figure 11:
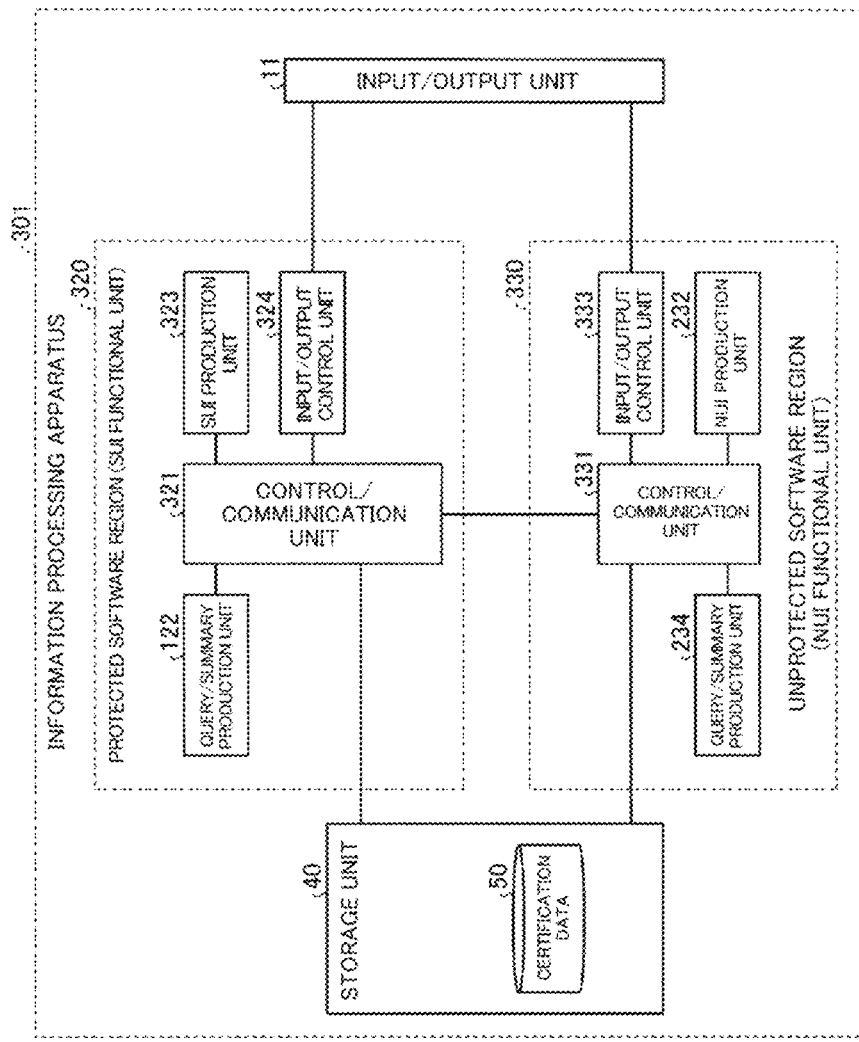
FIG. 11 is a diagram illustrating an example of a configuration of an information processing apparatus according to a third example.

Next, a description will be given of a third example. The third example is an example when the second conventional technique is applied to the SUI confirmation method. In the case of applying the second conventional technique to the SUI confirmation method, it is difficult to dispose a large number of components in the protected software region. Accordingly, in the third example, a configuration in which a plurality of components are disposed in the unprotected software region is proposed by way of example. FIG. 11 is a diagram illustrating an example of a configuration of an information processing apparatus according to the third example.

As illustrated in FIG. 11, an information processing apparatus 301 includes at least a protected software region (SUI functional unit) 320 (second software functional unit), an unprotected software region (NUI functional unit) 330 (first software functional unit), and the storage unit 40.

The SUI functional unit 320 corresponds to data recorded inside a security module and a trusted application (TA) that operates in in the security module. The NUI functional unit 330 corresponds to data recorded outside the security module and software that operates outside the security module, and includes an OS outside the security module.

The NUI functional unit 330 includes a control/communication unit 331, the NUI production unit 232, an input/output control unit 333 (first input/output control unit), and the query/summary production unit 234.

The control/communication unit 331 controls a function of each of components of the NUI functional unit 330, and also controls communication with another apparatus. The control/communication unit 331 includes software that operates outside the security module, e.g., an OS outside the security module.

The input/output control unit 333 controls input/output information between the input/output unit 11 and the control/communication unit 331. The input/output information may possibly be falsified (first threat). Specifically, malware in the NUI functional unit 330 or the like may possibly falsify a TIN (PIN). In this case, a PIN collation in payment results in an error, which interrupts a service. The input/output control unit 33 causes the input/output unit 11 to display a NUI screen produced by the NUI production unit 232, and receives an input of the query Q0 or the like. The input/output control unit 333 outputs, as the query Q1, the receive query Q0 to the SUI functional unit 320 via the control/communication unit 331.

The SUI functional unit 320 includes a control/communication unit 321, the query/summary production unit 122, a SUI production unit 323, and an input/output control unit 324.

The control/communication unit 321 controls a function of each of respective components of the application (TA) in the security module and the operating system, and also controls communication with another apparatus.

The SUI production unit 323 is software that produces screen information of a SUI screen (see, e.g., the SUI screen Ms in FIG. 2) displayed by the SUI functional unit 320. The SUI production unit 323 produces only the SUI screen which is a screen merely displaying the query Q1 and the M1 on one screen. When information knowable only by the user (e.g., a mother's maiden name) which is recorded in the security module is displayed as the SUI confirmation information, the SUI production unit 323 adds, to the SUI screen, display information of the information knowable only by the user. This allows the user to determine the presence or absence of, e.g., fake of a TOUT (e.g., a billing screen). This function can prevent the user from inputting a PIN code to malware, and can prevent a financial damage resulting from the use of a PIN code stolen by the malware.

The input/output control unit 324 controls input/output information between the input/output unit 11 and the control/communication unit 321 in the security module. The input/output control unit 324 causes the SUI screen to be displayed. At this time, the input/output control unit 324 adds, to the SUI screen, the SUI confirmation information that allows the user to confirm whether or not the SUI screen is protected. In the third example, the input/output control unit 324 performs control such that, e.g., "a physical means such as an LED lamp operable only by a program in the security module is turned ON".

By checking whether or not the LED lamp or the like has been turned ON, the user can confirm whether or not the displayed screen is a fake of the TOUT (e.g., a billing screen) produced by software (such as malware) in the NUI functional unit 330. This can prevent the user from inputting the PIN code to malware, not to the OS. Thus, it is possible to prevent malware from stealing the PIN code and prevent a financial damage resulting from unauthorized use of the PIN code. By checking whether or not the LED lamp or the like has been turned ON, the user can also confirm whether or not the displayed screen is a fake of the TOUT (e.g., a purchased product name or a billed amount on a billing screen) produced by the software (such as malware) in the NUI functional unit 330. Consequently, it is also possible to prevent the user from making payment to such a faked screen, and prevent the user or a seller from incurring a damage due to a difference between a value of a purchased product and an amount paid.

[Flow of Processing]

Figure 12:
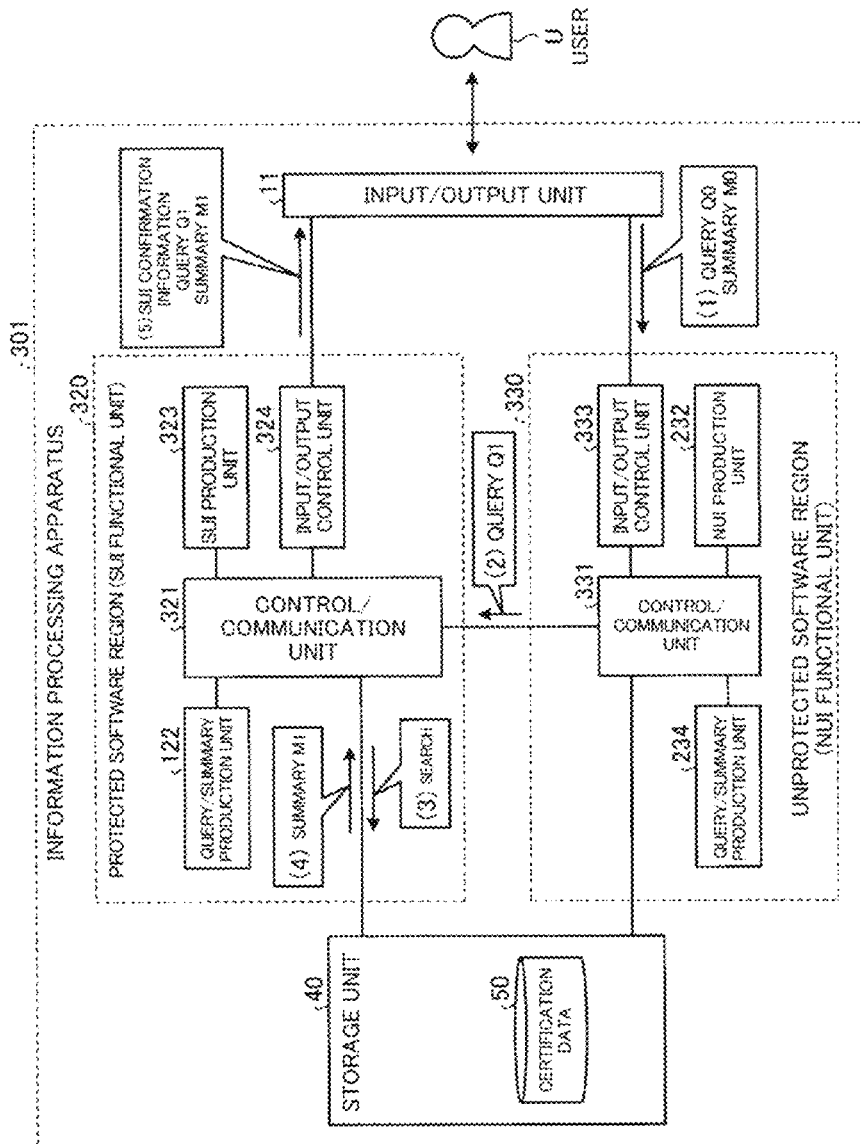
FIG. 12 is a chart illustrating a flow of processing in the information processing apparatus illustrated in FIG. 11.

Next, a description will be given of a flow of processing in the information processing apparatus 301. FIG. 12 is a chart illustrating a flow of processing in the information processing apparatus 301 illustrated in FIG. 11.

First, the NUI functional unit 330 receives inputs of the query Q0 and the summary M0 via the displayed NUI screen (see, e.g., the NUI screen Mn in FIG. 2) (see (1) of FIG. 12). Since the input/output control unit 333 of the NUI functional unit 330 is not protected herein, the first threat may possibly arise.

Next, in the NUI functional unit 330, the control/communication unit 331 gives an instruction to perform a display switch to the SUI screen provided by the SUI functional unit 320. The user gives an instruction to perform a screen switch via the input/output control unit 333 of the NUI functional unit 330. Note that, since the input/output control unit 333 is not protected, the second threat may possibly arise.

The input/output control unit 333 of the NUI functional unit 330 transmits, as the query Q1, the query Q0 input via the NUI screen to the control/communication unit 321 of the SUI functional unit 320 via the control/communication unit 331 (see (2) of FIG. 12). Note that, since the control/communication unit 331 is not protected, the third threat may possibly arise.

In the SUI functional unit 320, the query/summary production unit 122 searches the certification data based on the query Q1 via the control/communication unit 321 (see (3) of FIG. 12), and produces the summary M1 corresponding to the query Q1 (see (4) of FIG. 12). The query Q1 may possibly have been falsified, but a correspondence relationship between the query Q1 and the produced summary M1 is reliable.

Then, in the SUI functional unit 320, the SUI production unit 323 produces the screen information of the SUI screen including the query Q1 and the summary M1 (see, e.g., the SUI screen Ms in FIG. 2). At this time, the SUI production unit 323 adds, to the SUI screen, display information of information knowable only by the user as the SUI confirmation information (see (5) of FIG. 12). Then, in the SUI functional unit 320, when causing the input/output unit 11 to display the SUI screen including the query Q1 and the summary M1, the input/output control unit 324 turns ON an LED lamp operably only by the program in the security module or the like.

When the recognition of the SUI confirmation information including the display information of the information knowable only by the user, the turning ON of the LED lamp, and the like is successful, the user can confirm that the second threat has not arisen. Meanwhile, when the recognition of the SUI confirmation information is unsuccessful, the user can recognize the possibility that the second threat has arisen, and therefore advances to incident handling.

Then, by checking the SUI screen, the user can recognize that the first threat and the third threat have not arisen when the query Q0 and the summary M0 each recognized by the user have the same values as those of the query Q1 and the summary M1 each displayed on the SUI screen. When the query Q0 and the summary M0 do not have the same values as those of the query Q1 and the summary M1 each displayed on the SUI screen, the user can recognize the possibility that the first threat or the third threat has arisen, and therefore the user advances to the incident handling.

[Processing Procedure of Information Processing]

Figure 13:
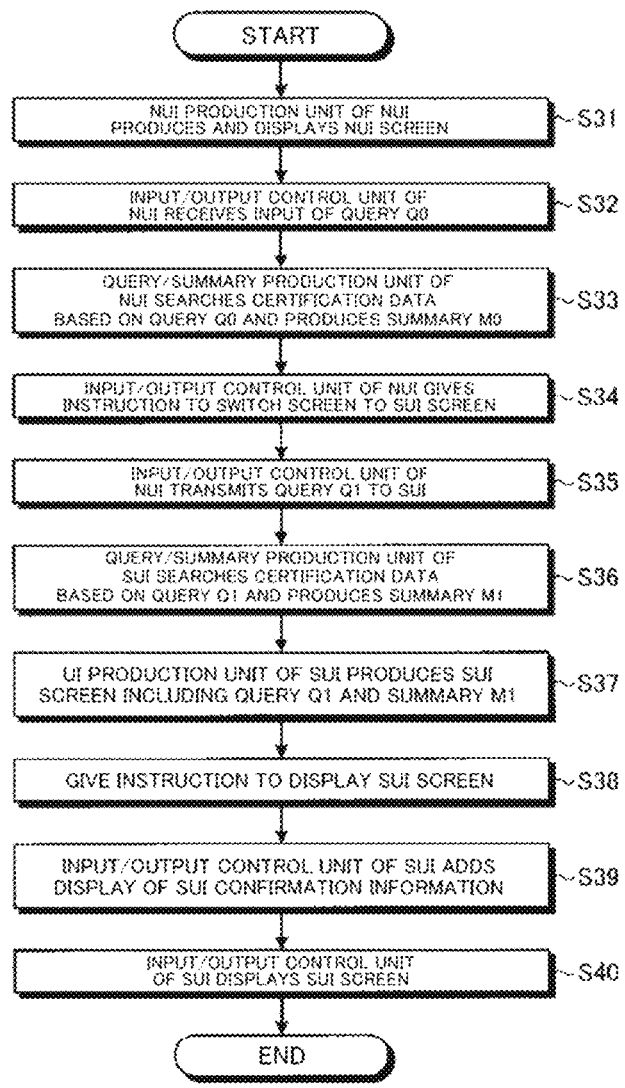
FIG. 13 is a flow chart illustrating a processing procedure of information processing according to the third example.

Next, a description will be given of a procedure of information processing according to the third example. FIG. 13 is a flow chart illustrating the processing procedure of the information processing according to the third example.

In Steps S31 to S36 illustrated in FIG. 13, the same processes as performed in Steps S21 to S26 illustrated in FIG. 10 are performed. In the SUI functional unit 220, the SUI production unit 323 produces the screen information of the SUI screen including the query Q1 and the summary M1 (Step S37). At this time, the SUI production unit 323 adds, to the SUI screen, the display information of the information knowable only by the user. The control/communication unit 321 gives an instruction to display the SUI screen to the input/output control unit 324 (Step S38).

Then, in the SUI functional unit 320, the input/output control unit 324 adds, to the SUI screen, the SUI confirmation information (Step S39). At this time, the input/output control unit 324 controls the turning ON of the LED lamp operable only by the program in the security module or the like to add the SUI confirmation information. The input/output control unit 324 causes the input/output unit 11 to display the SUI screen in a state in which the SUI confirmation information is added (Step S40).

As in the configuration of the third example, it is also possible to apply the second conventional technique to the SUI confirmation method.

FOURTH EXAMPLE

Next, a description will be given of a fourth example. In the fourth example, a description will be given of a configuration in which an information processing apparatus including the input/output unit 11 and an information processing apparatus storing the certification data 50 are separately provided. A description will be given of a case where the present invention is applied to the second example to provide the fourth example, but the present invention is also applicable to the third example.

Figure 14:
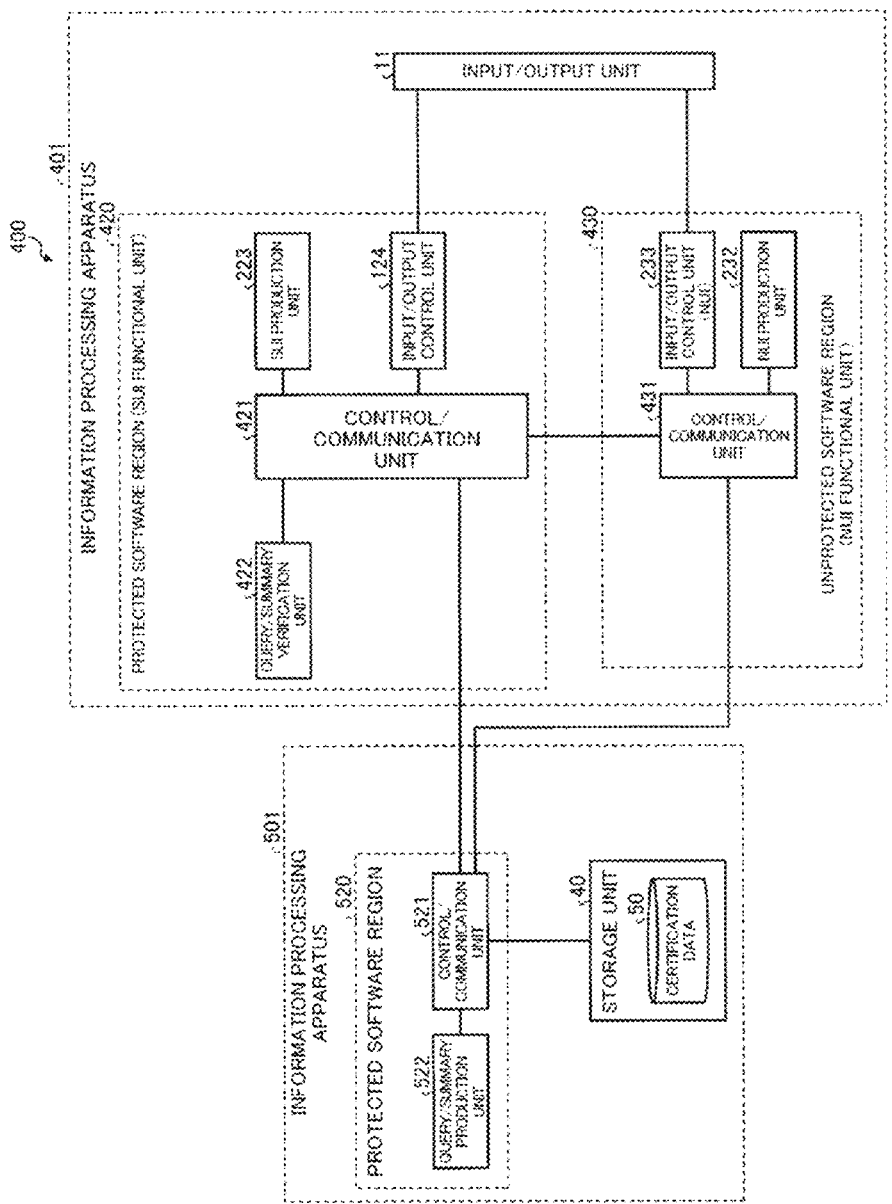
FIG. 14 is a diagram illustrating an example of a configuration of an information processing system according to a fourth example.

FIG. 14 is diagram illustrating an example of a configuration of an information processing system according to the fourth example. As illustrated in FIG. 14, the information processing system 400 includes an information processing apparatus 401 (first information processing apparatus) including the input/output unit 11 and an information processing apparatus 501 (second information processing apparatus) storing the certification data.

The information processing apparatus 401 includes an unprotected software region (NUI functional unit) 430 (first software functional unit) and a protected software region (SUI functional unit) 420 (second software functional unit).

The NUI functional unit 430 has a configuration obtained by removing the query/summary production unit 234 from the NUI functional unit 230 in FIG. 8. A control/communication unit 431 of the NUI functional unit 430 controls a function of each of components of the NUI functional unit 430, and also controls communication with other apparatuses including the information processing apparatus 501. When displaying the summary M0 on a NUI screen (e.g., the NUI screen Mn in FIG. 2), the control/communication unit 431 requests the summary M0 corresponding to the query Q0 from the information processing apparatus 501, and displays the summary M0 transmitted in response to the request on the NUI screen.

Compared with the SUI functional unit 220 in FIG. 8, the SUI functional unit 420 has a query/summary verification unit 422 instead of the query/summary production unit 122. Note that the control/communication unit 421 of the SUI functional unit 420 controls a function of each of components of the SUI functional unit 420, and also controls communication with other apparatuses including the information processing apparatus 501.

The query/summary verification unit 422 gives a request to produce the summary M1 corresponding to the query Q1 to the information processing apparatus 501 via the control/communication unit 421. The query/summary verification unit 422 verifies integrity of the summary M1 transmitted in response to the request.

The information processing apparatus 501 includes the storage unit 40 that stores the certification data 50 including a query and a summary corresponding to the query in a state in which integrity of the certification data is verifiable. The information processing apparatus 501 includes a protected software region 520 (third software functional unit) including a control/communication unit 521 and a query/summary production unit 522.

The control/communication unit 521 controls a function of each of components in the protected software region 520, and also controls communication with the other apparatuses including the information processing apparatus 501.

The query/summary production unit 522 searches, in response to a request to produce a summary, the certification data 50 on the basis of the query via the control/communication unit 521, and produces the summary on the basis of a result of the search. The query/summary production unit 522 transmits the produced summary to a requester via the control/communication unit 521.

For example, when receiving a request to produce the summary M0 from the NUI functional unit 430 of the information processing apparatus 401, the query/summary production unit 522 searches the certification data 50 on the basis of the query Q0, produces the summary M0 on the basis of the search result, and transmits the summary M0 to the NUI functional unit 430.

When receiving a request to produce the summary M1 from the query/summary verification unit 422 of the information processing apparatus 401, the query/summary production unit 522 searches the certification data 50 on the basis of the query Q1, produces the summary M1 on the basis of a result of the search, and transmits the summary M1 to the query/summary verification unit 422. At this time, the query/summary production unit 522 adds a digital signature to the produced summary M1. By verifying the digital signature added to the summary M1, the query/summary verification unit 422 can confirm that a correspondence relationship between the query Q1 and the summary M1 is valid.

[Flow of Processing]

Figure 15:
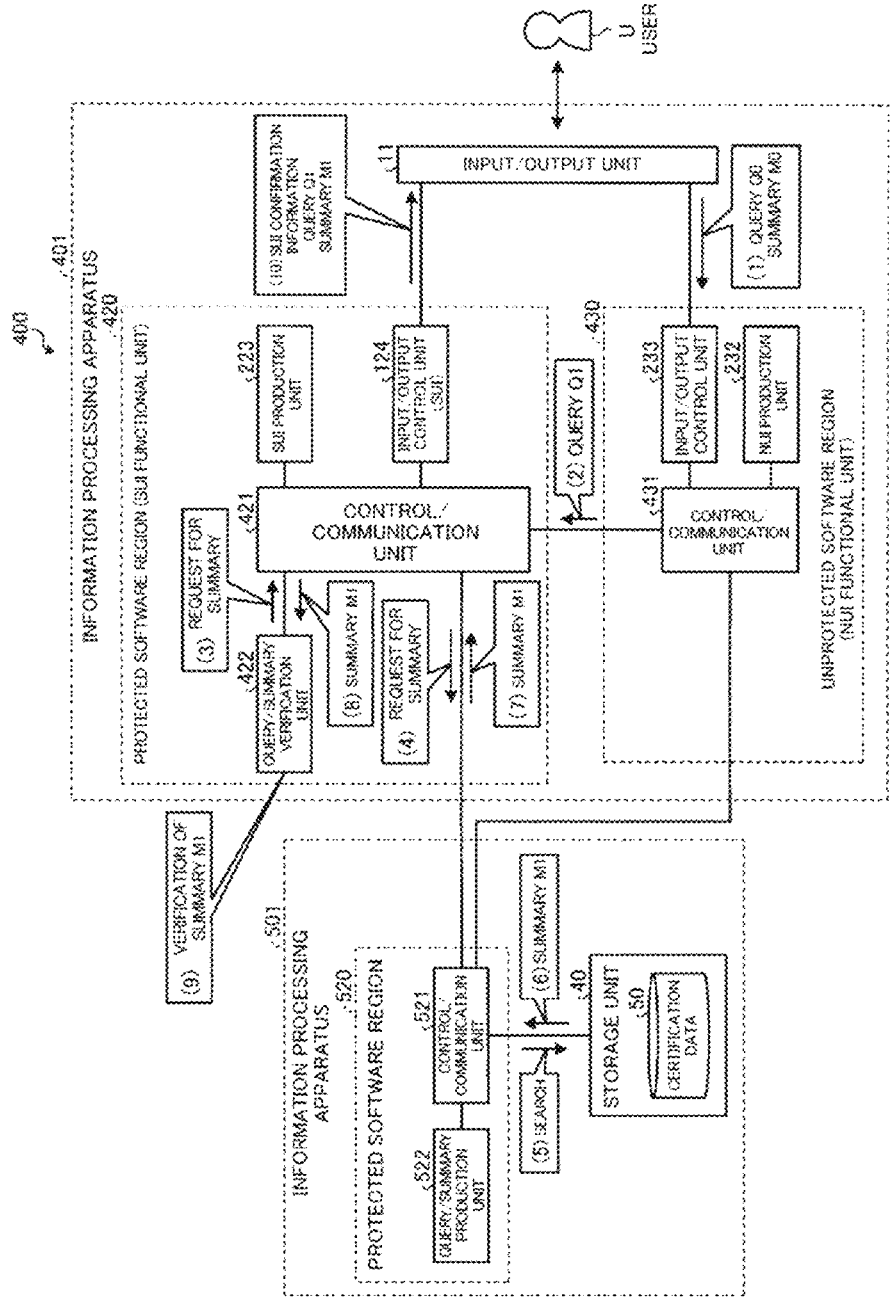
FIG. 15 is a chart illustrating a flow of processing in the information processing system illustrated in FIG. 14.

Next, a description will be given of a flow of processing in the information processing system 400. FIG. 15 is a chart illustrating a flow of processing in the information processing system 400 illustrated in FIG. 14.

First, the information processing apparatus 401 receives inputs of the query Q0 and the summary M0 via a displayed NUI screen (e.g., the NUI screen in FIG. 2) (see (1) of FIG. 15). Since the input/output control unit 233 of the NUI functional unit 430 is not protected, the first threat may possibly arise.

Next, in the information processing apparatus 401, the NUI functional unit 430 gives an instruction to perform a display switch to a SUI screen (e.g., the SUI screen Ms illustrated in FIG. 2) provided by the SUI functional unit 420. The user gives an instruction to switch the screen via the input/output control unit 233 of the NUI functional unit 430. Note that, since the input/output control unit 233 is not protected, the second threat may possibly arise.

In the information processing apparatus 401, the input/output control unit 233 of the NUI functional unit 430 transmits, as the query Q1, the query Q0 input via the NUI screen Mn to the control/communication unit 421 of the SUI functional unit 420 via the control/communication unit 431 (see (2) of FIG. 15). Note that, since the input/output control unit 233 and the control/communication unit 421 are not protected, the third threat may possibly arise.

In the SUI functional unit 420 of the information processing apparatus 401, the query/summary verification unit 422 gives, to the information processing apparatus 501, a request to produce the summary M1 corresponding to the query Q1 via the control/communication unit 421 (see (3) and (4) of FIG. 15).

In the information processing apparatus 501, when receiving the request to produce the summary via the control/communication unit 521, the query/summary production unit 522 searches the certification data based on the query Q1 in response to the request (see (5) of FIG. 15), and produces the summary M1 corresponding to the query Q1 (see (6) of FIG. 15). The query/summary production unit 522 transmits the produced summary M1 to the control/communication unit 421 of the information processing apparatus 401 via the control/communication unit 521 (see (7) of FIG. 15). The control/communication unit 421 outputs the received summary M1 to the query/summary verification unit 422 (see (8) of FIG. 15).

In the SUI functional unit 420 of the information processing apparatus 401, the query/summary verification unit 422 verifies the received summary M1 (see (9) of FIG. 15). When the verification of integrity of the summary M1 is successful, a correspondence relationship between the query Q1 and the received summary M1 is reliable.

Then, in the SUI functional Unit 420, the SUI production unit 223 produces screen information of the SUI screen including the query Q1 and the summary M1. Then, in the SUI functional unit 220, when causing the input/output unit 11 to display the SUI screen including the query Q1 and the summary M1, the input/output control unit 124 adds, to the SUI screen, display of SUI confirmation information (see (10) of FIG. 15).

[Processing Procedure of Information Processing]

Figure 16:
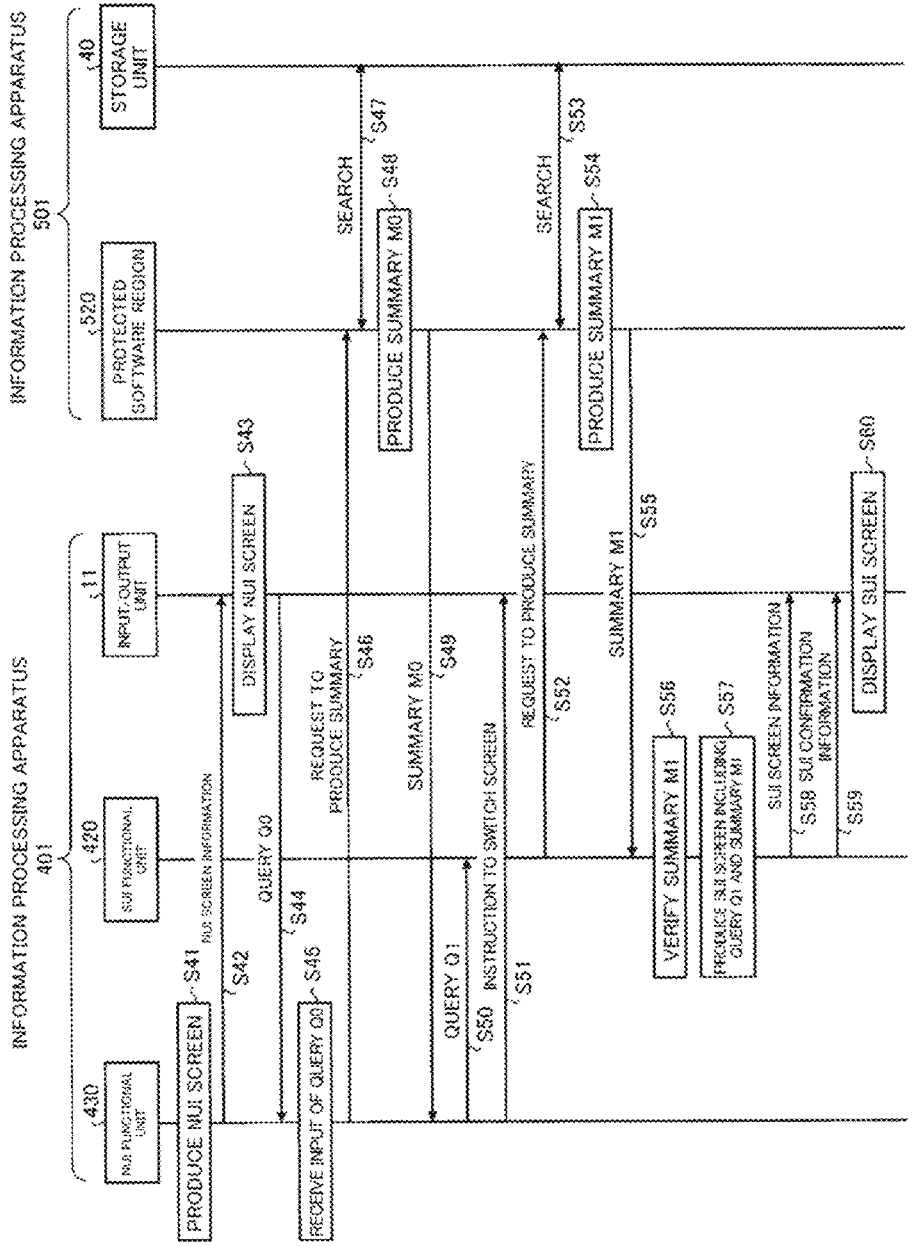
FIG. 16 is a sequence diagram illustrating a processing procedure of information processing according to the fourth example.

Next, a description will be given of a procedure of information processing according to the fourth example. FIG. 16 is a sequence diagram illustrating the processing procedure of the information processing according to the fourth example.

First, in the information processing apparatus 401, in the NUI functional unit 430, the NUI production unit 232 produces the NUI screen (Step S41), and the input/output control unit 233 causes the input/output unit 11 to display the NUI screen (Steps S42 and S43). In the NUI functional unit 430, the input/output control unit 233 receives an input of the query Q0 from the user via the NUI screen (Steps S44 and 45). When the summary M0 is displayed on the NUI screen, in the NUI functional unit 230, the control/communication unit 431 transmits, to the information processing apparatus 501, a request to produce a summary based on the query Q0 (Step S46).

In the protected software region 520 of the information processing apparatus 501, the query/summary production unit 522 searches the certification data 50 on the basis of the query Q0 (Step S47), and produces the summary M0 based on a result of the search (Step S48). In the information processing apparatus 501, the control/communication unit 521 of the protected software region 520 transmits the summary M0 to the NUI functional unit 430 of the information processing apparatus 401 (Step S49).

In the information processing apparatus 401, in the NUI functional unit 430, the input/output control unit 233 transmits the query Q0 input via the NUI screen as the query Q1 to the SUI functional unit 420 via the control/communication unit 431 (Step S50). The NUI functional unit 430 gives an instruction to perform a display switch from the NUI screen to the SUI screen (Step S51).

In the SUI functional unit 420 of the information processing apparatus 401, the query/summary verification unit 422 transmits, to the information processing apparatus 501, a request to produce a summary on the basis of the query Q1 via the control/communication unit 431 (Step S52).

In the protected software region 520 of the information processing apparatus 501, the query/summary production unit 522 searches the certification data 50 on the basis of the query Q1 (Step S53), and produces the summary M1 on the basis of a result of the search (Step S54). At this time, the query/summary production unit 522 adds a digital signature to the produced summary M1. In the information processing apparatus 501, the control/communication unit 521 in the protected software region 520 transmits the summary M1 to the SUI functional unit 420 of the information processing apparatus 401 (Step S55).

In the SUI functional unit 420 of the information processing apparatus 401, the query/summary verification unit 422 verifies the received summary M1 (Step S56). In the SUI functional unit 420, the SUI production unit 223 produces screen information of a SUI screen including the query Q1 and the summary M1 (Step S57), and the control/communication unit 421 gives an instruction to display the SUI screen to the input/output control unit 124 (Step S58).

At this time, in the SUI functional unit 420, the input/output control unit 124 adds SUI confirmation information to the SUI screen (Step S59), and causes the input/output unit 11 to display the SUI screen in a state in which the SUI confirmation information is added (Step S60).

In the configuration of the fourth example, a mechanism for searching the certification data 50 can be omitted in the SUI functional unit 420 of the information processing apparatus 401, in contrast to the configuration of the second example. Accordingly, it is possible to minimize implementation of the SUI functional unit 420 of the information processing apparatus 401.

Note that, as described above, the configuration of the fourth example is also applicable to the third example. The information processing apparatus 501 can also be further divided into a plurality of information processing apparatuses.

[System Configuration, etc.]

Each of the components of each of the apparatuses illustrated in the drawings is functionally conceptual, and need not necessarily be physically configured as illustrated in the drawings. In other words, specific forms of distribution/integration of the individual apparatuses are not limited to those illustrated in the drawings, and all or part thereof can be configured in a functionally or physically distributed/integrated manner in any unit depending on various loads, usage conditions, or the like. Further, all or any part of processing functions performed in the individual apparatuses may be realized by a CPU and a program analyzed and executed by the CPU or may be realized as hardware based on wired logic.

The processing described in the present embodiment includes the processing described as the processing to be automatically performed, and all or part thereof can also be manually performed. Alternatively, all or part of the processing described as the processing to be manually performed can also be automatically performed by a known method. Besides, information including the processing procedures, the control procedures, the specific names, and the various data and parameters described in the documents described above or illustrated in the drawings can be freely modified unless otherwise specified.

[Program]

Figure 17:
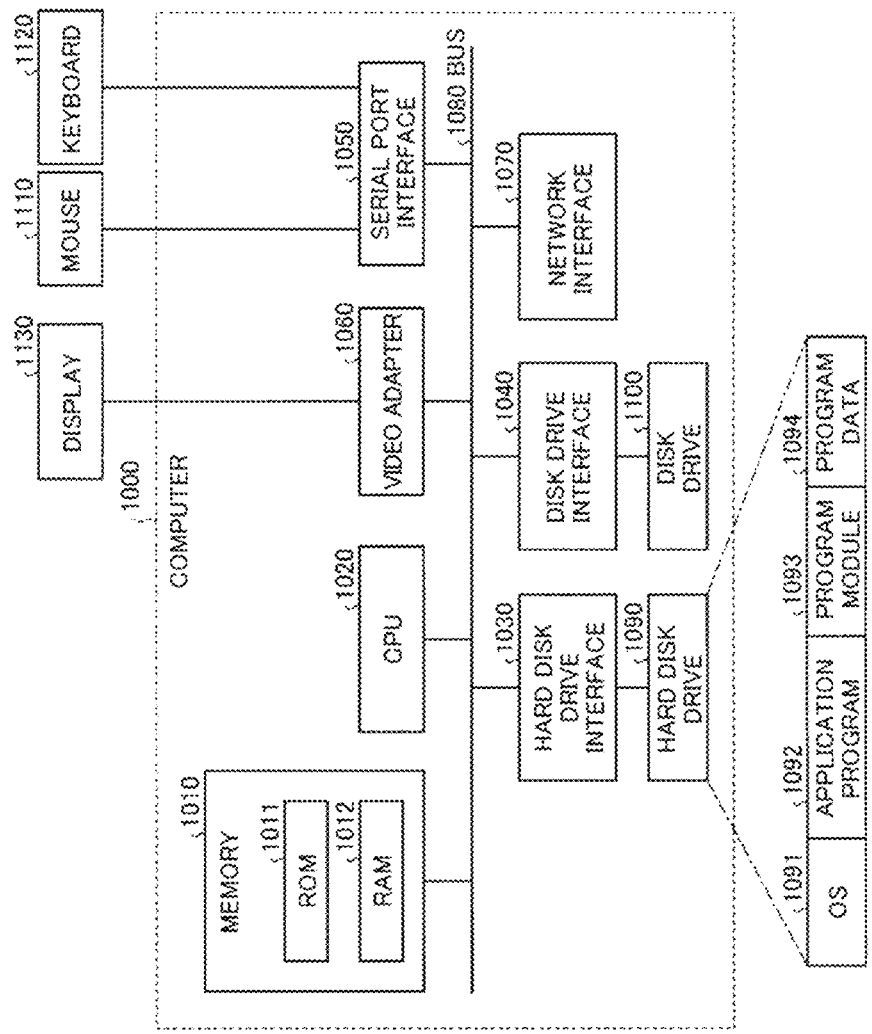
FIG. 17 is a diagram illustrating an example of a computer which is caused to execute a program to realize an information processing apparatus.

FIG. 17 is a diagram illustrating an example of a computer which is caused to execute a program to realize each of the information processing apparatuses 101, 201, 301, 401, and 501. A computer 1000 includes, e.g., a memory 1010 and a CPU 1020. The computer 1000 also includes a hard disk drive interface 1030, a disk drive interface 1040, a serial port interface 1050, a video adapter 1060, and a network interface 1070. These components are connected by a bus 1080.

The memory 1010 includes a ROM 1011 and a RAM 1012. The ROM 1011 stores a boot program such as, e.g., BIOS (Basic Input Output System). The hard disk drive interface 1030 is connected to the hard disk drive 1090. The disk drive interface 1040 is connected to the disk drive 1100. For example, a detachable storage medium such as a magnetic disk or an optical disk is inserted into the disk drive 1100. The serial port interface 1050 is connected to, e.g., a mouse 1110 or a keyboard 1120. The video adapter 1060 is connected to, e.g., a display 1130.

The hard disk drive 1090 stores, e.g., an OS (Operating System) 1091, an application program 1092, a program module 1093, and program data 1094. In other words, programs that prescribe processing in the individual processing apparatuses 101, 201, 301, 401, and 501 are implemented as a program module 1093 in which codes executable by the computer are described. The program module 1093 is stored in, e.g., the hard disk drive 1090. For example, the program module 1093 for executing the same processing as performed by a functional configuration in each of the information processing apparatuses 101, 201, 301, 401, and 501 is stored in the hard disk drive 1090. Note that the hard disk drive 1090 may also be replaced by a SSD (Solid State Drive).

Also, setting data used in the processing in the embodiment described above is stored as the program data 1094 in, e.g., the memory 1010 or the hard disk drive 1090. As necessary, the CPU 1020 reads the program module 1093 and the program data 1094 which are stored in the memory 1010 and the hard disk drive 1090 into the RAM 1012 and executes the program module 1093 and the program data 1094.

Note that the present invention is not limited to a case where the program module 1093 and the program data 1094 are stored in the hard disk drive 1090. For example, the program module 1093 and the program data 1094 may also be stored in a detachable storage medium and read by the CPU 1020 via the disk drive 1100 or the like. Alternatively, the program module 1093 and the program data 1094 may also be stored in another computer connected via a network (such as a LAN or a WAN (Wide Area Network)). The program module 1093 and the program data 1094 may also be read by the CPU 1020 from the other computer via the network interface 1070.

While the embodiment to which the invention achieved by the present inventors is applied has been described heretofore, the present invention is not limited by statements and the drawings which form part of the disclosure of the present invention according to the present embodiment. In other words, all of other embodiments, examples, operational techniques, and the like which are implemented by those skilled in the art on the basis of the present embodiment are included in the scope of the present invention.

REFERENCE SIGNS LIST 1, 101, 201, 301, 401, 501 Information processing apparatus
11 Input/output unit
20 Protected functional unit (SUI functional unit)
30 Unprotected functional unit (NUI functional unit)
40 Storage unit
50 Certification data
120, 220, 320, 420, 520 Protected software region
121, 221, 231, 321, 331, 421, 431, 521 Control/communication unit
122, 234, 522 Query/summary production unit
123 UI production unit
124, 131, 233, 324, 333 Input/output control unit
130, 230, 330, 430 Unprotected software region
223, 323 SUI production unit
232 NUI production unit
422 Query/summary verification unit

The invention claimed is:

1. An information processing apparatus comprising:
a normal user interface (NUI);
a secure user interface (SUI) having a protection level higher than that of the NUI; and
an input/output user interface that receives an input of information and displays and outputs the information,
wherein the NUI includes:
a first input/output controller that causes the input/output user interface to display a first screen with a button which prompts a switch to the SUI,
wherein the SUI, which includes a second input/output controller, is configured to:
responsive to activation of the button, switch from the NUI to the SUI, the second input/output controller causing the input/output user interface to display a second screen associated with the SUI, search certification data to acquire summary data, and display, on the second screen associated with the SUI the summary data, and add a user prompt for user confirmation of the summary data, wherein, in a first case where confirmation of the summary data is successful, the information processing apparatus confirms that no threats are present; and wherein, in a second case where the confirmation of the summary data is unsuccessful, the information processing apparatus advances to incident handling.

2. The information processing apparatus according to claim 1, wherein, when causing the input/output user interface to display the second screen, the second input/output controller adds, to the second screen, as the user prompt, a display function of allowing whether or not the second screen is protected to be confirmed.

3. The information processing apparatus according to claim 1, wherein a first query is displayed on the first screen and a second query and the summary data each are displayed on the second screen and are used when presence or absence of falsification of input/output information is determined in an information transmission path extending from the input/output user interface through the NUI.

4. The information processing apparatus according to claim 3, further comprising: a computer-readable storage memory that stores the certification data in a state in which integrity of the certification data is verifiable, wherein the SUI searches the certification data based on the second query and produces the summary data based on a result of the search of which integrity is verified.

5. The information processing apparatus according to claim 1, wherein the button is not shown in the second screen.

6. The information processing apparatus according to claim 1, wherein the first screen includes a first query and a first summary and the second screen includes a second query and a second summary associated with the summary data, wherein the confirmation of the summary data includes comparing the second query against the first query and comparing the second summary against the first summary, wherein a first mismatch of the first summary and the second summary indicates that the confirmation of the summary data should be unsuccessful, and wherein a second mismatch of the first query and the second query indicates that the confirmation of the summary data should be unsuccessful.

7. The information processing apparatus according to claim 1, wherein at least one functional button associated with a query and at least one functional button associated with a summary are shown on the first screen, and wherein the at least one functional button associated with the query and the at least one functional button associated with the summary are not shown in the second screen.

8. An information processing system comprising:

a first information processing apparatus including a normal user interface (NUI) and a secure user interface (SUI) having a protection level higher than that of the NUI; and a second information processing apparatus including functionality having a protection level higher than that of the NUI, wherein the first information processing apparatus further includes:

an input/output user interface that receives an input of information and displays and outputs the information, wherein the NUI includes:

a first input/output controller that causes the input/output user interface to display a first screen with a button which prompts a switch to the SUI, wherein the SUI which includes a second input/output controller, is configured to:

responsive to activation of the button, switch from the NUI to the SUI, the second input/output controller causing the input/output user interface to display a second screen associated with the SUI, wherein the second information processing apparatus further includes:

a computer-readable storage memory that stores certification data including a query and a summary corresponding to the query in a state in which integrity of the certification data is verifiable, and wherein the second information processing apparatus is configured to search the certification data to acquire summary data and transmit the summary data to the first information processing apparatus, wherein the first information processing apparatus is configured to display, on the second screen associated with the SUI, the summary data from the second information processing apparatus, and add a user prompt for user confirmation of the summary data, wherein, in a first case where confirmation of the summary data is successful the first information processing apparatus confirms that no threats are present; and wherein, in a second case where the confirmation of the summary data is unsuccessful, the first information processing apparatus advances to incident handling.

9. The information processing system according to claim 8, wherein the button is not shown in the second screen.

10. The information processing system according to claim 8, wherein the first screen includes a first query and a first summary and the second screen includes a second query and a second summary associated with the summary data, wherein the confirmation of the summary data includes comparing the second query against the first query and comparing the second summary against the first summary, wherein a first mismatch of the first summary and the second summary indicates that the confirmation of the summary data should be unsuccessful, and wherein a second mismatch of the first query and the second query indicates that the confirmation of the summary data should be unsuccessful.

11. The information processing system according to claim 8, wherein at least one functional button associated with the query and at least one functional button associated with the summary are shown on the first screen, and wherein the at least one functional button associated with the query and the at least one functional button associated with the summary are not shown in the second screen.

12. An information processing method to be executed by an information processing apparatus that allows a user to confirm information is not falsified including a normal user interface (NUI) and a secure user interface (SUI) having a protection level higher than that of the NUI, the information processing apparatus including an input/output user interface that receives an input of information and displays and outputs the information, the NUI including a first input/output control unit controller, the SUI including a second input/output controller, the information processing method comprising:

the first input/output controller causing the input/output user interface to display a first screen with a button which prompts a switch to the SUI;

responsive to activation of the button, switching from the NUI to the SUI, the second input/output controller causing the input/output user interface to display a second screen associated with the SUI;

searching, using the SUI, certification data to acquire summary data;

displaying, on the second screen associated with the SUI, the summary data, and adding a user prompt for user confirmation of the summary data;

in a first case where confirmation of the summary data is successful, confirming that no threats are present; and in a second case where the confirmation of the summary data is unsuccessful, advancing to incident handling.

13. The information processing method according to claim 12, wherein the button is not shown in the second screen.

14. The information processing method according to claim 12, wherein the first screen includes a first query and a first summary and the second screen includes a second query and a second summary associated with the summary data, wherein the conformation of the summary data includes comparing the second query against the first query and comparing the second summary against the first summary, wherein a first mismatch of the first summary and the second summary indicates that the confirmation of the summary data should be unsuccessful, and wherein a second mismatch of the first query and the second query indicates that confirmation of the summary data should be unsuccessful.

15. The information processing method according to claim 12, wherein at least one functional button associated with a query and at least one functional button associated with a summary are shown on the first screen, and wherein the at least one functional button associated with the query and the at least one functional button associated with the summary are not shown in the second screen.

\* \* \* \* \*